(12) United States Patent
Lee et al.

(10) Patent No.: US 12,730,495 B2
(45) Date of Patent: Sep. 8, 2026

(54) METHOD FOR PERFORMING FUNCTION USING BIOMETRIC SIGNAL AND ELECTRONIC DEVICE SUPPORTING SAME

(71) Applicant: SAMSUNG ELECTRONICS CO., LTD., Suwon-si (KR)

(72) Inventors: Seungwon Lee, Suwon-si (KR); Duseon Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 550 days.

(21) Appl. No.: 18/102,981

(22) Filed: Jan. 30, 2023

(65) Prior Publication Data

US 2023/0185363 A1 Jun. 15, 2023

Related U.S. Application Data

(63) Continuation of application No. PCT/KR2021/007273, filed on Jun. 10, 2021.

(30) Foreign Application Priority Data

Jul. 31, 2020 (KR) ........................ 10-2020-0095650

(51) Int. Cl.
*G06F 3/01* (2006.01)

(52) U.S. Cl.
CPC .................................... *G06F 3/011* (2013.01)

(58) Field of Classification Search
CPC ....... G06F 3/011; A61B 5/681; A61B 5/0245; A61B 5/02427; A61B 5/743; A61B 5/02108
See application file for complete search history.

(56) References Cited

U.S. PATENT DOCUMENTS 6,440,066 B1 8/2002 Bardy
2008/0194925 A1 8/2008 Alsafadi et al.
(Continued)

FOREIGN PATENT DOCUMENTS

CN 104068837 10/2014
CN 104739424 7/2015
(Continued)

OTHER PUBLICATIONS

Extended European Search Report dated Dec. 14, 2023 issued in European Patent Application No. 21850864.6.
(Continued)

*Primary Examiner* — Stephanie E Bloss
(74) *Attorney, Agent, or Firm* — NIXON & VANDERHYE P.C.

(57) ABSTRACT

An electronic device according to various embodiments of the present disclosure may comprise: a sensor module, comprising at least one sensor, configured to measure a biometric signal, at least one processor, and a memory, wherein the memory includes instructions that, when executed, cause the at least one processor to: receive, while performing a first function, an input for performing a second function using a second biometric signal using a first biometric signal; determine a priority between the first function and the second function, based on a measurement scheme of the second biometric signal specified by the input and a measurement scheme of the first biometric signal; and perform a function having a higher priority, among the first function and the second function, using the sensor module, based on the priority.

18 Claims, 11 Drawing Sheets

(56) References Cited

U.S. PATENT DOCUMENTS

| | | | | |
|---|---|---|---|---|
| 2010/0234694 | A1 | 9/2010 | Takano et al. | |
| 2011/0231863 | A1 | 9/2011 | Takano et al. | |
| 2013/0237775 | A1 | 9/2013 | Gross | |
| 2014/0247151 | A1 | 9/2014 | Proud et al. | |
| 2015/0185819 | A1* | 7/2015 | Saito | G16H 40/63 713/323 |
| 2015/0216458 | A1 | 8/2015 | Kasahara et al. | |
| 2015/0223705 | A1 | 8/2015 | Sadhu | |
| 2016/0367138 | A1* | 12/2016 | Kim | A61B 5/6898 |
| 2017/0185856 | A1* | 6/2017 | Park | G06V 40/70 |
| 2018/0189568 | A1* | 7/2018 | Powderly | G06V 30/194 |
| 2018/0278843 | A1 | 9/2018 | Smith et al. | |
| 2019/0015041 | A1 | 1/2019 | Chung et al. | |
| 2019/0313980 | A1 | 10/2019 | Yoon et al. | |

FOREIGN PATENT DOCUMENTS

| | | | | |
|---|---|---|---|---|
| CN | 108431731 | | 8/2018 | |
| CN | 111276243 | A * | 6/2020 | G06F 18/23213 |
| EP | 2116181 | A2 | 11/2009 | |
| JP | 2010-217948 | | 9/2010 | |
| JP | WO10-100735 | | 9/2012 | |
| JP | 2013-544545 | | 12/2013 | |
| JP | 2015-123300 | | 7/2015 | |
| JP | 2015-142663 | | 8/2015 | |
| JP | 2017-174192 | | 9/2017 | |
| JP | 2018-196757 | A | 12/2018 | |
| KR | 10-2009-0029464 | | 3/2009 | |
| KR | 10-2010-0077919 | | 7/2010 | |
| KR | 10-2013-0107066 | | 10/2013 | |
| KR | 10-2014-0058107 | | 5/2014 | |
| KR | 10-2014-0058118 | | 5/2014 | |
| KR | 10-2016-0086159 | | 7/2016 | |
| KR | 10-2016-0149911 | A | 12/2016 | |
| KR | 10-2017-0076500 | A | 7/2017 | |
| KR | 10-2019-0007619 | | 1/2019 | |
| KR | 10-2019-0120684 | | 10/2019 | |
| WO | 2006/120600 | | 11/2006 | |
| WO | WO-2006120600 | A1 * | 11/2006 | G16H 40/67 |
| WO | 2013/141419 | | 9/2013 | |
| WO | 2015/137412 | | 9/2015 | |
| WO | 2017/144293 | | 8/2017 | |
| WO | 2020-050561 | A1 | 3/2020 | |

OTHER PUBLICATIONS

Chinese Office Action issued Oct. 31, 2024 in corresponding Chinese Patent Application No. 202180057696.X.

International Search Report dated Sep. 14, 2021 issued in PCT/KR2021/007273 (6 pages).

Written Opinion of ISA dated Sep. 14, 2021 issued in PCT/KR2021/007273 (4 pages).

Indian Office Action issued Jul. 3, 2024 in corresponding Indian Patent Application No. 202317007036.

Chinese Office Action dated Jul. 8, 2025 issued in Chinese Patent Application No. 202180057696.X and English translation, 18 pp.

Chinese Decision to Grant dated Nov. 20, 2025 issued in Chinese Patent Application No. 202180057696.X and English translation, 8 pp.

Chinese Second Office Action dated Apr. 29, 2025 issued in Chinese Patent Application No. 202180057696.X and English translation.

Decision of Korean Patent Office to Grant dated May 19, 2026 in connection with a counterpart Korean application 10-2020-0095650 (English language translation provided).

Indian Patent Office Examination report issued on Apr. 27, 2026 in the corresponding Indian patent application 202317007036?.

* cited by examiner

| | | | | | | | | |
|---|---|---|---|---|---|---|---|---|
| Priority 1 | Function H | Function F | Function G | Function A | Function A | Function D | Function D | Function J |
| Priority 2 | | Function H | Function F | Function G | Function D | Function G | Function G | Function D |
| Priority 3 | | | Function H | Function F | Function G | Function F | Function H | Function G |
| Priority 4 | | | | Function H | Function F | Function H | | Function H |
| Priority 5 | | | | | Function H | | | |

METHOD FOR PERFORMING FUNCTION USING BIOMETRIC SIGNAL AND ELECTRONIC DEVICE SUPPORTING SAME

CROSS-REFERENCE TO RELATED APPLICATIONS

This application is a continuation of International Application No. PCT/KR2021/007273 designating the United States, filed on Jun. 10, 2021, in the Korean Intellectual Property Receiving Office and claiming priority to Korean Patent Application No. 10-2020-0095650, filed on Jul. 31, 2020, in the Korean Intellectual Property Office, the disclosures of which are incorporated by reference herein in their entireties.

BACKGROUND

Field

The disclosure relates to a method for performing a function using a biometric signal and an electronic device supporting the same.

Description of Related Art

Recently, the use of portable electronic devices such as smartphones, tablet personal computers (tablet PCs), and wearable devices have increased, and, technology for measuring biometric signals also developed according to the development of technology.

An electronic device may include various sensors capable of measuring biometric signals of a user while being worn on the user and provide a variety of biometric information using the measured biometric signals. For example, a wearable device may measure a photoplethysmogram (PPG) signal using an optical method and an electrocardiogramal using an electrical signal. The wearable device may provide biometric information such as a heart rate (HR), stress information (e.g., stress index), and sleep state information using the PPG signals and provide biometric information such as atrial fibrillation using the ECG signals. Also, the wearable device may provide a function of detecting whether or not the wearable device is worn on the user using the biometric signal.

In line with the development of technology, the types of sensors that are mounted to electronic devices (e.g., wearable devices) to measure biometric signals are diversifying, and functions using the biometric signals are also diversifying.

In the case where a plurality of functions using a biometric signal is requested to be performed, an electronic device (e.g., a wearable device) may not be able to simultaneously perform the requested plurality of functions. For example, a wearable device may not be able to simultaneously measure a plurality of biometric signals or, even if a plurality of biometric signals is simultaneously measured, may not be able to simultaneously perform a plurality of functions using the plurality of measured biometric signals due to physical limitations such as the size of the wearable device and limitations of computing resources for processing the biometric signals.

In the case where a plurality of functions incapable of being performed simultaneously and using a biometric signal are requested, the electronic device needs to determine the order of performing the plurality of functions and sequentially perform the plurality of functions according to the determined order.

SUMMARY

Embodiments of the disclosure provide an electronic device and a method for performing functions using a biometric signal, which includes determining priority between functions, based on at least one of a measurement scheme of the biometric signal, a specified group, or a performance request time for each of the functions using the biometric signal, and perform the functions, based on the determined priority, and an electronic device supporting the same.

An electronic device according to various example embodiments of the disclosure may include: a sensor module, including at least one sensor, configured to measure a biometric signal, at least one processor functionally connected to the sensor module, and a memory functionally connected to the at least one processor, wherein the memory may include instructions that, when executed, cause the at least one processor to: receive, while performing a first function using a first biometric signal, an input for performing a second function using a second biometric signal, determine a priority between the first function and the second function, based on a measurement scheme of the second biometric signal specified by the input and a measurement scheme of the first biometric signal, and perform a function having a higher priority, among the first function and the second function, using the sensor module, based on the priority.

A method for performing a function using a biometric signal in an electronic device according to various example embodiments of the disclosure may include: receiving, while performing a first function using a first biometric signal, an input for performing a second function using a second biometric signal, determining a priority between the first function and the second function, based on a measurement scheme of the second biometric signal specified by the input and a measurement scheme of the first biometric signal, and performing a function having a higher priority, among the first function and the second function, using a sensor module of the electronic device, based on the priority.

An electronic device according to various example embodiments of the disclosure may include: a sensor module, comprising at least one sensor, configured to measure a biometric signal, at least one processor functionally connected to the sensor module, and a memory functionally connected to the at least one processor and including a plurality of groups having different priorities set therefor, wherein the memory may include instructions that, when executed, cause the at least one processor to: receive, while performing a first function using a first biometric signal, an input for performing a second function using a second biometric signal, identify a first group corresponding to the first function and a second group corresponding to the second function, from among the plurality of groups, determine a priority between the first function and the second function, based on the priority of the first group and the priority of the second group, and perform a function having a higher priority, among the first function and the second function, based on the priority, using the sensor module.

A method for performing a function using a biometric signal and an electronic device for supporting the same according to various example embodiments of the disclosure may determine priority between functions, based on at least one of a measurement scheme of the biometric signal, a specified group, or a performance request time for each of the functions using the biometric signal, and perform the functions, based on the determined priority, thereby executing the functions adaptively and efficiently.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
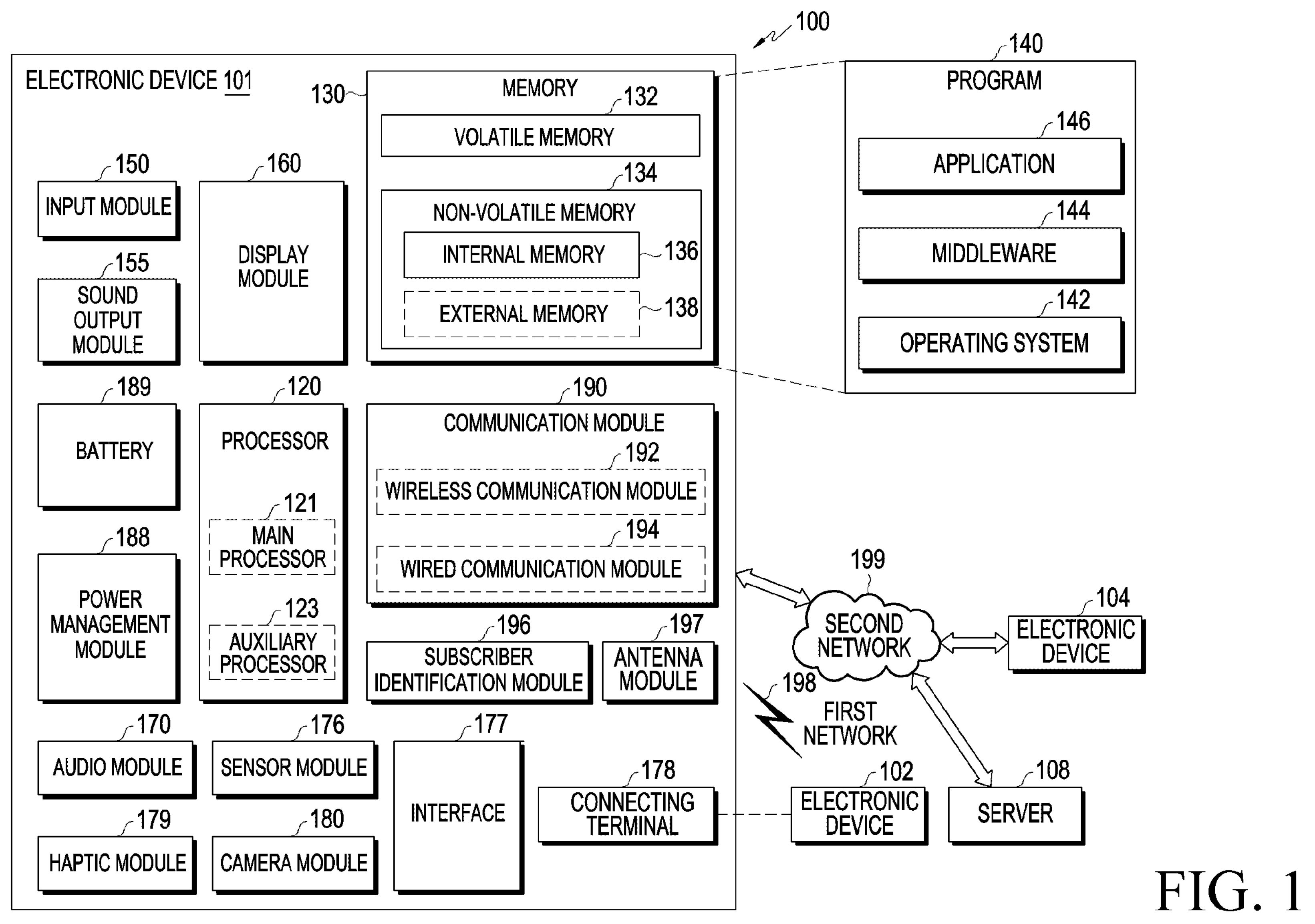
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module)). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “1st” and “2nd”, or “first” and “second” may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
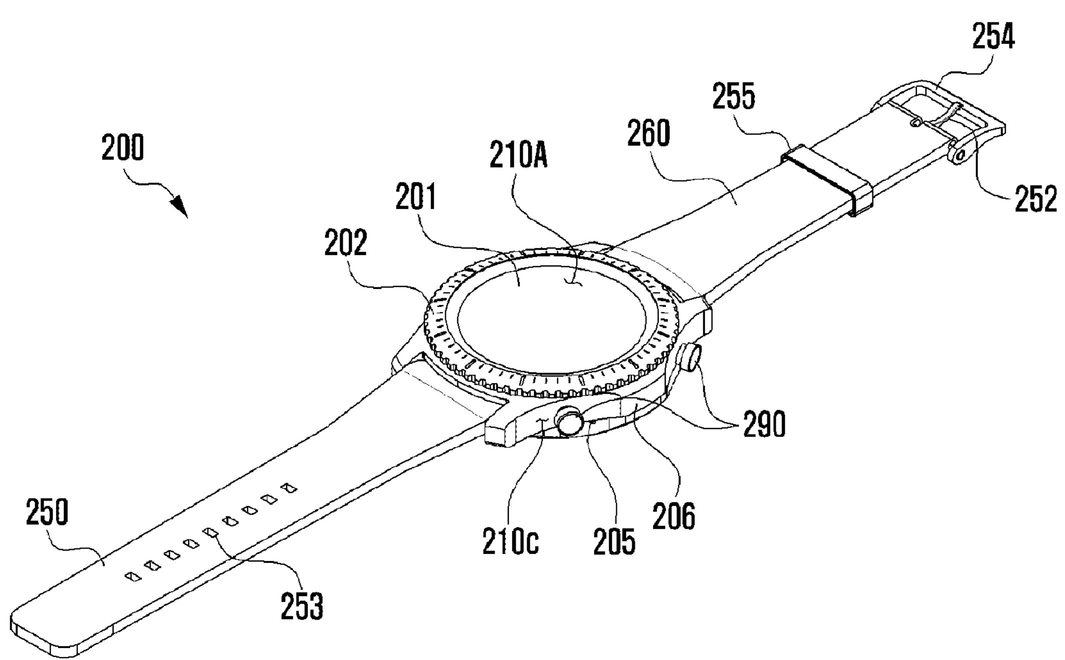
FIG. 2 is a front perspective view of an electronic device according to various embodiments.
Figure 3:
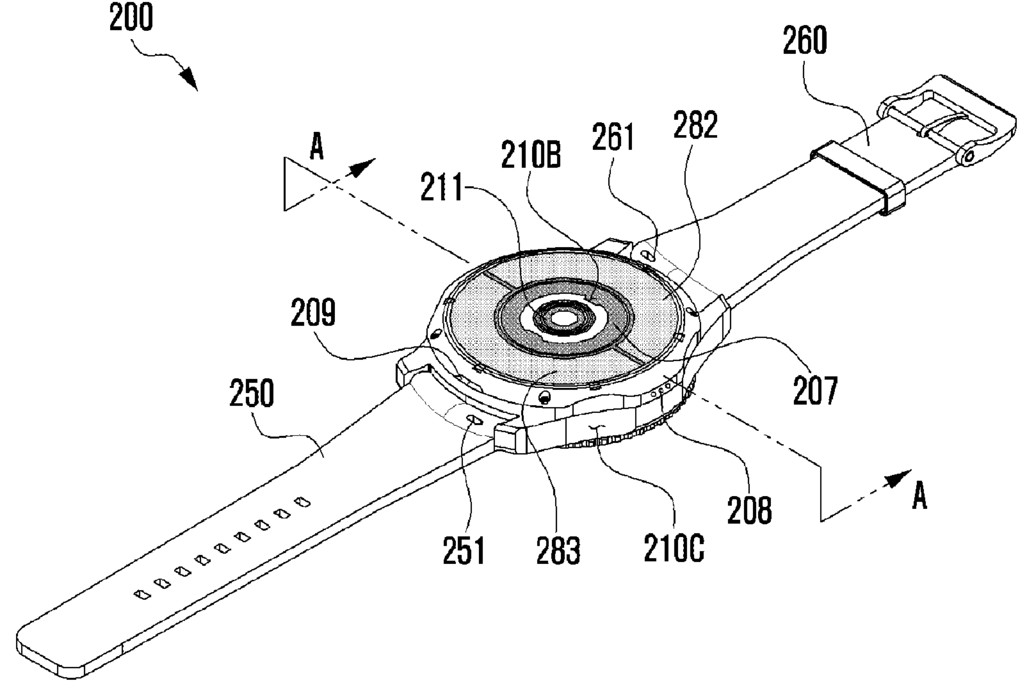
FIG. 3 is a rear perspective view of an electronic device according to various embodiments.
Figure 4:
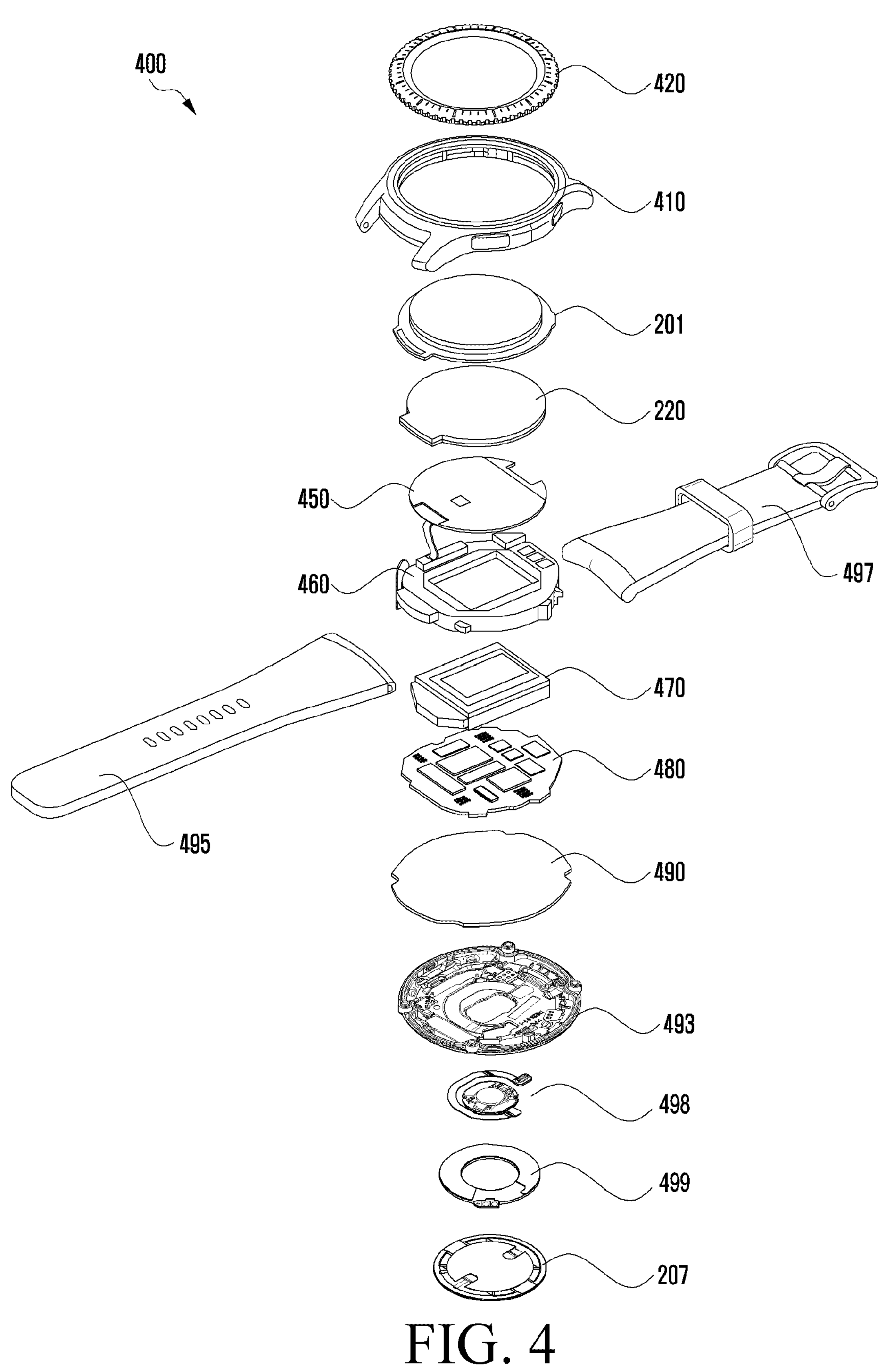
FIG. 4 is an exploded perspective view of an electronic device according to various embodiments.

FIG. 2 is a front perspective view of an electronic device according to various embodiments. FIG. 3 is a rear perspective view of an electronic device according to various embodiments. FIG. 4 is an exploded perspective view of an electronic device according to various embodiments.

Referring to FIGS. 2 and 3, an electronic device 200 (e.g., the electronic device 101 in FIG. 1) according to an embodiment may include a housing 210 including a first surface (or front surface) 210A, a second surface (or rear surface) 210B, and a side surface 210C surrounding a space between the first surface 210A and the second surface 210B, and fastening members (e.g., straps or bands) 250 and 260 coupled to at least a part of the housing 210 and configured to detachably fasten the electronic device 200 to a user's body part (e.g., wrist, ankle, or the like). In an embodiment (not shown), the housing may refer to a structure forming some of the first surface 210A, the second surface 210B, and the side surface 210C in FIG. 2. According to an embodiment, the first surface 210A may be formed by a front plate 201 (e.g., a glass plate or polymer plate including various coating layers) that is substantially transparent at least in part. The second surface 210B may be formed by a rear cover 207 that is substantially opaque. The rear cover 207 may be formed of, for example, coated or tinted glass, ceramic, polymer, metal (e.g., aluminum, stainless steel (STS), or magnesium), or a combination of at least two of the above materials. The side surface 210C may be formed by a side bezel structure (or "side member") 206 coupled to the front plate 201 and the rear cover 207 and including metal and/or polymer. In various embodiments, the rear cover 207 and the side bezel structure 206 may be integrally formed and include the same material (e.g., a metal material such as aluminum). The fastening members 250 and 260 may be formed of various materials and shapes. They may be formed integrally or such that a plurality of unit links is movable relative to each other by a woven material, leather, rubber, urethane, metal, ceramic, or a combination of at least two of the above materials.

According to an embodiment, electrodes 282 and 283 made of a conductive material may be formed in one area of the rear cover 207 of the electronic device 200. In an embodiment, additional electrodes may be formed on the side bezel structure 206. For example, the electronic device 200 may include two electrodes (e.g., the electrodes 282 and 283) and an additional electrode in the side bezel structure 206 to measure an ECG signal. In an embodiment, although not shown in FIGS. 2 to 4, the electronic device 200 may include four or more (e.g., four or eight) electrodes in order to measure a bio-electrical impedance analysis (BIA) signal.

According to an embodiment, the electronic device 200 may include at least one or more of a display 220 (see FIG. 4), audio modules 205 and 208, a sensor module 211, key input devices 202 and 290, and a connector hole 209. In various embodiments, the electronic device 200 may exclude at least one (e.g., the key input devices 202 and 290, the connector hole 209, or the sensor module 211) of the elements or further include other elements.

The display 220 may be visible, for example, through a substantial portion of the front plate 201. The display 220 may have a shape corresponding to the shape of the front plate 201, such as a circular shape, an elliptical shape, or a polygonal shape. The display 220 may be connected to a touch detection circuit, a pressure sensor capable of measuring the intensity (pressure) of a touch, and/or a fingerprint sensor or disposed adjacent thereto.

The audio modules 205 and 208 may include a microphone hole 205 and a speaker hole 208. A microphone for obtaining external sound may be disposed inside the microphone hole 205, and in various embodiments, a plurality of microphones may be disposed to detect the direction of sound. The speaker hole 208 may be used as an external speaker and a receiver for a call. In various embodiments, the speaker hole 208 and the microphone hole 205 may be implemented as one hole, or a speaker may be included without the speaker hole 208 (e.g., a piezo speaker).

The sensor module 211 may include various sensors and generate an electrical signal or data value corresponding to an internal operation state of the electronic device 200 or an external environmental state. The sensor module 211 may include, for example, a biometric sensor module 211 (e.g., an HRM sensor) disposed on the second surface 210B of the housing 210. The electronic device 200 may further include a sensor module that is not shown, for example, at least one of a gesture sensor, a gyro sensor, an atmosphere pressure sensor, a magnetic sensor, an acceleration sensor, a grip sensor, a color sensor, an infrared (IR) sensor, a biometric sensor, a temperature sensor, a humidity sensor, and an illuminance sensor.

The key input devices 202 and 290 may include a wheel key 202 disposed on the first surface 210A of the housing 210 and rotatable in at least one direction, and/or a side key button 290 disposed on the side surface 210C of the housing 210. The wheel key may have a shape corresponding to the shape of the front plate 201. In an embodiment, the electronic device 200 may exclude some or all of the above-mentioned key input devices 202 and 290, and the excluded key input devices 202 and 290 may be implemented in another form such as soft keys on the display 220. The connector hole 209 may receive a connector (e.g., a USB connector) for transmitting and receiving power and/or data to and from an external electronic device and another connector hole (not shown) for receiving a connector for transmitting and receiving an audio signal to and from an external electronic device may be included. The electronic device 200 may further include, for example, a connector cover (not shown) that covers at least a portion of the connector hole 209 and prevents and/or reduces foreign substances from entering the connector hole.

The fastening members 250 and 260 may be in the form of a band or strap and may be detachably attached to at least a part of the housing 210 using locking members 251 and 261. The fastening members 250 and 260 may include one or more of a fixing member 252, a fixing member fastening hole 253, a band guide member 254, and a band fixing ring 255.

The fixing member 252 may be configured to fix the housing 210 and the fastening members 250 and 260 to a user's body part (e.g., wrist, ankle, or the like). The fixing member fastening hole 253 may fix the housing 210 and the fastening members 250 and 260 to a user's body part, corresponding to the fixing member 252. The band guide member 254 may be configured to limit the movement range of the fixing member 252 when the fixing member 252 is fastened with the fixing member fastening hole 253, so that the fastening members 250 and 260 may be tightly attached to a user's body part. The band fixing ring 255 may limit the movement range of the fastening members 250 and 260 when the fixing member 252 and the fixing member fastening hole 253 are fastened.

Referring to FIG. 4, the electronic device 400 may include a side bezel structure 410, a wheel key 420, a front plate 201, a display 220, a first antenna 450, a support member 460 (e.g., a bracket), a battery 470, a first printed circuit board 480, a sealing member (e.g., a seal) 490, a rear plate 493, a second printed circuit board 498, a wireless charging coil 499, a rear cover 207, and fastening members (e.g. a strap or band) 495 and 497. At least one of the elements of the electronic device 400 may be the same as or similar to at least one of the elements of the electronic device 200 in FIG. 2 or 3, and duplicate descriptions thereof may not be repeated below. The support member 460 may be disposed inside the electronic device 400 to be connected to the side bezel structure 410 or integrally formed with the side bezel structure 410. The support member 460 may be formed of, for example, a metal material and/or a non-metal (e.g., polymer) material. The support member 460 may have the display 220 coupled to one side thereof and the first printed circuit board 480 coupled to the opposite side thereof. A processor, a memory, and/or an interface may be mounted on the first printed circuit board 480. The processor may include, for example, one or more of a central processing unit, an application processor, a graphic processing unit (GPU), a sensor processor, or a communication processor.

According to an embodiment, the memory may include, for example, volatile memory or non-volatile memory. The interface may include, for example, a high-definition multimedia interface (HDMI), a universal serial bus (USB) interface, an SD card interface, and/or an audio interface. For example, the interface may electrically or physically connect the electronic device 400 to an external electronic device, and include a USB connector, an SD card/MMC connector, or an audio connector.

According to an embodiment, the battery 470 is a device for supplying power to at least one element of the electronic device 400 may include, for example, a non-rechargeable primary battery, a rechargeable secondary battery, or a fuel cell. At least a portion of the battery 470 may be disposed on substantially the same plane as, for example, the first printed circuit board 480. The battery 470 may be integrally disposed inside the electronic device 200 or disposed detachably from the electronic device 200.

According to an embodiment, the first antenna 450 may be disposed between the display 220 and the support member 460. The first antenna 450 may include, for example, a near-field communication (NFC) antenna, a wireless charging antenna, and/or a magnetic secure transmission (MST) antenna. For example, the first antenna 450 may perform short-range communication with an external device, wirelessly transmit and receive power required for charging, and transmit a short-range communication signal or a magnetic-based signal including payment data. In an embodiment, a part of the side bezel structure 410 and/or the support member 460 or a combination thereof may configure an antenna structure.

According to an embodiment, the sealing member 490 may include a seal positioned between the side bezel structure 410 and the rear plate 493. The sealing member 490 may be configured to prevent and/or reduce moisture and foreign substances from entering into a space surrounded by the side bezel structure 410 and the rear plate 493 from the outside.

According to an embodiment, a second printed circuit board (e.g., a printed circuit board (PCB), a flexible printed circuit board (FPCB), or a rigid-flexible PCB (RFPCB)) 498 and a wireless charging coil 499 may be disposed between the rear plate 493 and the rear cover 207.

Figure 5:
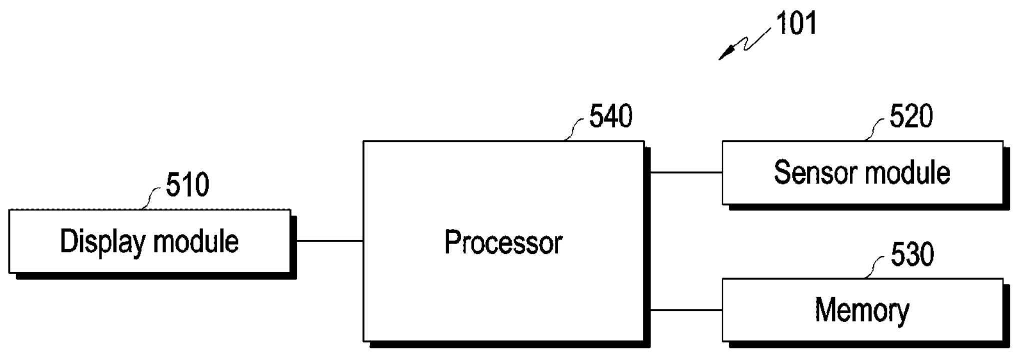
FIG. 5 is a block diagram illustrating an example configuration of an electronic device according to various embodiments.

FIG. 5 is a block diagram illustrating an example configuration of an electronic device 101 according to various embodiments.

In an embodiment, the electronic device 101 may perform various functions related to a biometric signal (or biometric information) (e.g., PPG or ECG). Hereinafter, a function using a biometric signal by the electronic device 101 may be referred to as a "function using a biometric signal" or a "function".

In an embodiment, a function using a biometric signal may be performed by executing an application related to the biometric signal (e.g., by receiving a request from the application). For example, a heart rate function using a photoplethysmogram (PPG) signal may be performed by executing an application for measuring a heart rate. As another example, an ECG measurement (or provision) function using an electrocardiogramaignal may be performed by executing an application for measuring ECG. In an embodiment, a function using a biometric signal may be performed based on settings of the electronic device 101 (e.g., a system of the electronic device 101). For example, a function of detecting whether the electronic device 101 is worn on a user's body (e.g., the user's wrist) (hereinafter referred to as a "wearing detection function") may be performed by system settings of the electronic device 101.

Referring to FIG. 5, in an embodiment, an electronic device 101 may include a display module (e.g., including a display) 510, a sensor module (e.g., including at least one sensor) 520, a memory 530, and a processor (e.g., including processing circuitry) 540.

In an embodiment, the display module 510 may be included in at least one of the display module 160 in FIG. 1 or the display module 220 in FIG. 2.

In an embodiment, the display module 510 may include a display and display a variety of information related to a function using a biometric signal. For example, the display module 510 may display heart rate or stress information (or stress index) obtained based on a PPG signal.

In an embodiment, the display module 510 may display a screen related to setting of a function using a biometric signal. For example, the display module 510 may display a user interface for selecting a scheme for measuring a biometric signal to perform a function using biometric information. However, the information displayed by the display module 510 is not limited to the above example.

In an embodiment, the sensor module 520 may be included in at least one of the sensor module 176 in FIG. 1 or the sensor module 211 in FIG. 2.

In an embodiment, the sensor module 520 may include at least one sensor, including, for example, and without limitation, a biometric signal detector (not shown) and a biometric signal processor (not shown).

In an embodiment, a biometric signal detector for detecting a PPG signal may include a light-emitting unit and a light-receiving unit. The light-emitting unit may output light to the user's skin. The light-emitting unit may output sequentially or simultaneously at least one of an infrared ray and a red, a green, and/or a blue light. The light-emitting unit may include at least one of a spectrometer, a vertical cavity surface emitting laser (VCSEL), a light-emitting diode (LED), a white LED, and a white laser. The light-receiving unit may receive light (or light signal) input from the outside. For example, the light-receiving unit may receive at least partial light (or optical signal) reflected from the user's body tissue (e.g., skin, skin tissue, fat layer, vein, artery, and/or capillary) among the light output from the light-emitting unit. In addition, the light-receiving unit may output a signal corresponding to the received light. For example, the light-receiving unit may include at least one of an avalanche photodiode (APD), a single photon avalanche diode (SPAD), a photodiode, a photomultiplier tube (PMT), a charge coupled device (CCD), a CMOS array, or a spectrometer. However, elements included in the biometric signal detector for detecting a PPG signal are not limited to the light-emitting unit and the light-receiving unit. Hereinafter, elements (e.g., the light-emitting unit, the light-receiving unit, and the biometric signal processor) of the sensor module 520 for detecting a PPG signal may be referred to as a "PPG sensor".

In an embodiment, a biometric signal detector including circuitry for detecting an ECG signal may include a plurality of electrodes (e.g., three or more electrodes). The plurality of electrodes may receive biometric signals having different electrical physical quantities. For example, the plurality of electrodes may include a first electrode for obtaining a signal from the wrist of the hand wearing the electronic device 101, a second electrode for biopotential biasing of the wrist of the same hand, and a third electrode for obtaining a signal from the opposite hand. Although the above example is illustrated to include three electrodes, it is not limited thereto. In an embodiment, the biometric signal detector for detecting an ECG signal may include two electrodes. For example, the biometric signal detector for detecting an ECG signal may include only a first electrode for obtaining a signal from the wrist of the hand wearing the electronic device, excluding the second electrode for biopotential biasing, and a third electrode for obtaining a signal from the opposite hand.

In an embodiment, a biometric signal detector for detecting a bio-electrical impedance analysis (BIA) signal may include three or more electrodes (e.g., four electrodes or eight electrodes). Hereinafter, elements (e.g., three or more electrodes and a biometric signal processor) of the sensor module 520 for detecting an ECG signal may be referred to as an "ECG sensor".

In an embodiment, the biometric signal processor may process the biometric signal detected by the biometric signal detector. In an embodiment, the biometric signal detector (e.g., an analog front end) may include an amplifier for amplifying a biometric signal and an analog-to-digital converter (ADC) for converting the analog biometric signal into a digital biometric signal. However, elements included in the biometric signal detector are not limited to the above-described amplifier and ADC. In an embodiment, the sensor module 520 may be implemented as a single physical package including a biometric signal detector (not shown) and a biometric signal processor (not shown). For example, the sensor module 520 may be implemented as a single physical package including an ECG sensor and a PPG sensor. However, the sensor module 520 is not limited thereto and may be implemented as a plurality of independent (e.g., separate) physical elements. For example, the sensor module 520 may include an ECG sensor and a PPG sensor as independent hardware.

In an embodiment, the memory 530 may be included in the memory 130 in FIG. 1.

In an embodiment, the memory 530 may store (e.g., include) information related to performance of a function using a biometric signal. Information related to performance of a function using a biometric signal stored in the memory 530 will be described later in detail.

In an embodiment, the processor 540 may be included in the processor 120 in FIG. 1. In an embodiment, the processor 540 may include one or more processors.

In an embodiment, the processor 540 may include various processing circuitry and control an operation of performing a function using a biometric signal.

In an embodiment, the processor 540 may receive an input for performing a second function (e.g., a second function using a biometric signal) while performing a first function (e.g., a first function using a biometric signal).

In an embodiment, if an input (or request) for performing a function (e.g., a second function) using a biometric signal is received, the processor 540 may register a function (e.g., a second function) related to the received input. Hereinafter, "registration" may refer to an operation to indicate that a function using a biometric signal is currently being performed or is scheduled to be performed. For example, if a first function is registered, the first function may be currently being performed or may be scheduled to be performed. In an embodiment, if an input for performing a function using a biometric signal is received, the processor 540 may register a function related to the received input using a table (or list) related to registration (e.g., indicating a function being performed or scheduled to be performed) (hereinafter referred to as a "table"). For example, if an input for performing a function using a biometric signal is received, the processor 540 may include a function related to the received input in the table. In an embodiment, the table may be stored in the memory 530.

In an embodiment, if an input for performing a second function is received while performing the first function, the processor 540 may further register a second function in the state in which the first function was registered. For example, if an input for performing a second function is received while performing the first function, the processor 540 may include the second function, in addition to the first function, in the table.

In an embodiment, although the setting of the operation of the sensor module 520 for measuring biometric signals is different, the processor 540 may register the functions of the same biometric signal independently (or separately or as different functions). For example, the processor 540 independently register a heart rate measurement function using a PPG signal measured using a green light and a heart rate measurement function using a PPG signal measured using an infrared ray.

In an embodiment, the processor 540 may recall the registered function after the function using the biometric signal is registered. Hereinafter, "recall" may refer to an operation in which registration is canceled (or deleted) after a function using a biometric signal is registered. For example, when performance of a function using a biometric signal is completed, the function that has been performed may be recalled. As another example, if a function using a biometric signal is registered and then if an input for cancelling the performance of the registered function is received, the registered function may be recalled. In an embodiment, when a registered function is recalled, the recalled function may be excluded (e.g., deleted) from the table.

In an embodiment, an input for performing a function using a biometric signal may include an input received from a user using an application related to the biometric signal. For example, the input for performing a function using a biometric signal may include a user input for performing a heart rate measurement function by executing an application for measuring a heart rate.

In an embodiment, an input for performing a function using a biometric signal may include an input according to system settings of the electronic device 101. For example, an input for performing a function using a biometric signal may include an input for performing a wearing detection function input from the system of the electronic device 101 if specified conditions are satisfied (e.g., when the electronic device 101 is turned on or when an application related to a biometric signal is executed).

In an embodiment, when a plurality of functions is registered, the processor 540 may determine priority between registered functions.

In an embodiment, the processor 540 may determine priority between registered functions, based on a measurement scheme of a biometric signal, which is specified by an input for performing the function.

In an embodiment, a measurement scheme of a biometric signal may include a scheme for measuring a biometric signal in response to a user input for performing a function using a biometric signal (hereinafter referred to as a "first measurement scheme") and a scheme for measuring a biometric signal, based on specified settings (hereinafter referred to as a "second measurement scheme").

In an embodiment, when a function is performed in the first measurement scheme, the processor 540 may perform the function in response to a user input for performing the function using biometric information (e.g., immediately after the user input) and provide a result of the performed function. For example, if a user input for performing a function is received by selecting the first measurement scheme, the processor 540 may measure a biometric signal to perform a function and display biometric information obtained (e.g., produced) based on the measured biometric signal a predetermined number of times (e.g., once) on the display module 510.

In an embodiment, when a function is performed in the second measurement scheme, the processor 540 may measure a biometric signal based on specified settings and continuously perform the functions, based on the measured biometric signal. For example, the processor 540, based on a setting specified such a function is to be continuously performed (e.g., a function is to be repeatedly performed) while the electronic device 101 is worn on the user's body, may measure a biometric signal (e.g., a PPG signal) and perform a function (e.g., a wearing detection function), based on the measured biometric signal.

Hereinafter, a first measurement scheme and a second measurement scheme for performing a function using biometric information will be described in greater detail below with reference to FIG. 6.

Figure 6:
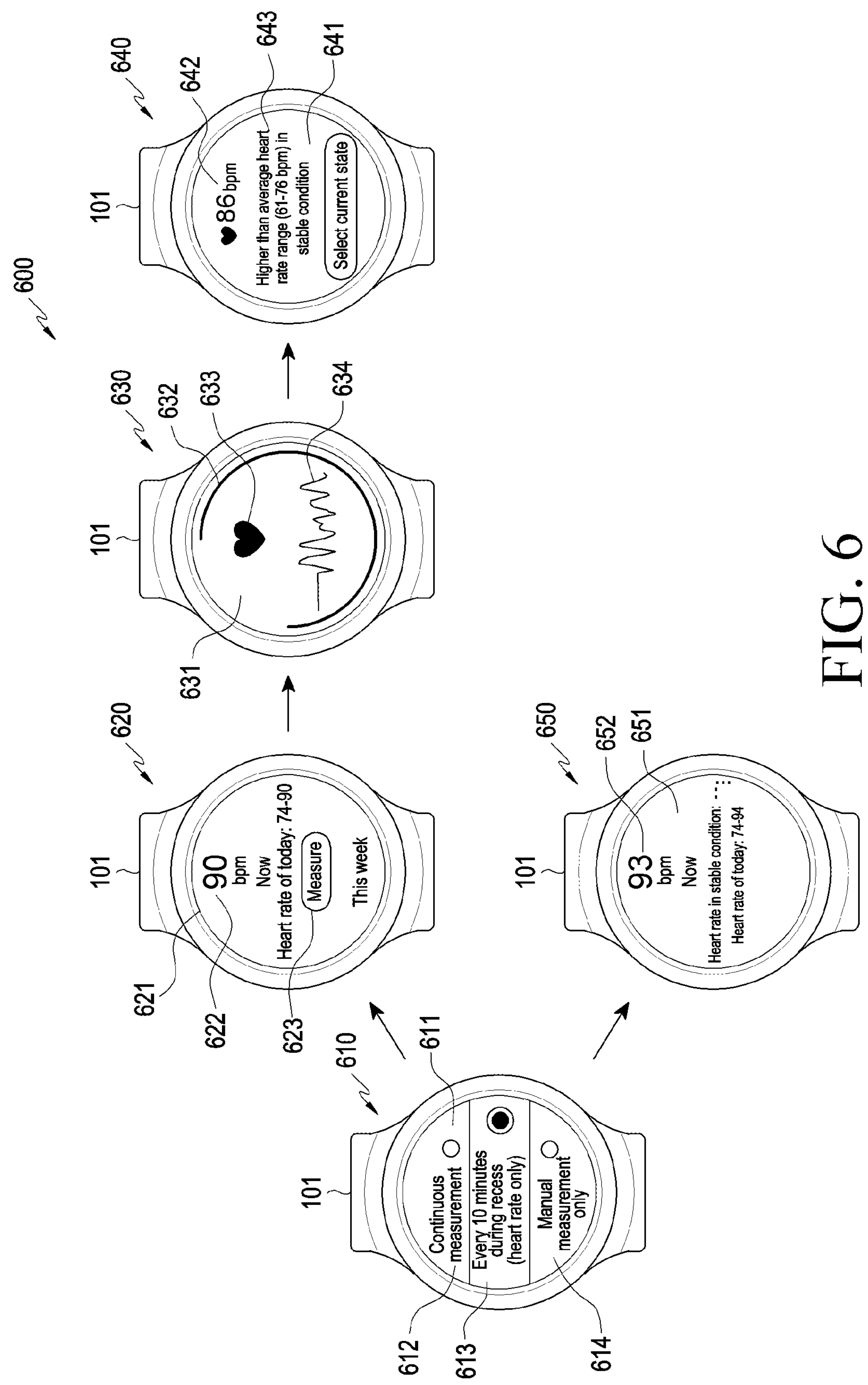
FIG. 6 is a diagram illustrating a first measurement scheme and a second measurement scheme according to various embodiments.

FIG. 6 is a diagram 600 illustrating examples of a first measurement scheme and a second measurement scheme according to various embodiments.

Referring to FIG. 6, in an embodiment, in 610, the processor 540, based on a user input for setting a function (e.g., a heart rate measurement function) using a biometric signal, displays a screen 611 for selecting a measurement scheme of the biometric signal (e.g., a PPG signal) on the display module 510. For example, the processor 540 may display, on the display module 510, a first object 614 representing a first measurement scheme, and a second object 612 and a third object 613 representing a second measurement scheme.

In an embodiment, if an input for selecting the first object 614 is received from the user, the processor 540, as shown in 620, the processor 540 may display a screen 621 including an object 623 for performing a heart rate measurement function in the first measurement scheme and an object 622 indicating a previously (e.g., most recently) measured heart rate on the display module 510. If a user input to the object 623 is received (e.g., in response to receiving a touch input to the object 623), the processor 540 may measure a PPG signal (e.g., a PPG sensor) through the sensor module 520 and obtain (e.g., produce) a heart rate, based on the measured PPG signal, thereby performing a heart rate measurement function. The processor 540 may register a heart rate measurement function when a user input to the object 623 is received. While the heart rate measurement function is being performed, the processor 540, as shown in 630, may display, on the display module 510, a screen 631 including an animation 633 indicating that the heart rate measurement function is being performed, a graph 634 related to the measured heart rate (or PPG signal), and an object 632 indicating the progress of the heart rate measurement function (e.g., a gauge bar in which a gauge increases in proportion to the progress of the heart rate measurement function). As shown in 640, the processor 540 may display, on the display, a screen 641 including an object 642 indicating the measured heart rate (e.g., the currently measured heart rate) and text 643 related to the user's average heart rate.

In an embodiment, if an input for selecting the second object 612 is received from the user, the processor 540 may perform a heart rate measurement function in the second measurement scheme. For example, if an input for selecting the second object 612 is received from the user, the processor 540 may measure a PPG signal through the sensor module 520 (e.g., a PPG sensor) to perform a heart rate measurement function. The processor 540 may perform a heart rate measurement function for continuously obtaining a heart rate based on the measured PPG signal. If an input for selecting the second object 612 is received from the user, the processor 540, as shown in 650, may display, on the display module 510, a screen 651 including an object 652 representing a heart rate produced (or updated) continuously (e.g., in real time) as the heart rate measurement function is continuously performed. In an embodiment, if an input for selecting the second object 612 is received from the user, the processor 540 may display information about a heart rate, which is continuously produced as the heart rate measurement function is continuously performed, in various schemes. For example, the processor 540 may display a notification including information about a heart rate that is continuously produced on the display module 160. As another example, in response to a heart rate greater than or equal to a specified heart rate, which is continuously produced for a specified period of time or more, the processor 540 may display information about the continuously produced heart rate (or information related to the heart rate) on the display module 160. As another example, the processor 540 may output vibration related to information about the continuously produced heart rate through the haptic module 179. In an embodiment, the processor 540 may display information about the continuously produced heart rate on a standby screen or a lock screen as well as a performance screen of an application related to biometric information. Although FIG. 6 illustrates the heart rate measurement function, the disclosure is not limited thereto, and the above-described examples may be applied, for example, and without limitation, to a stress measurement function or a sleep monitoring function, etc. in the same or similar manner.

In an embodiment, the processor 540 may register a heart rate measurement function if an input for selecting the second object 612 is received from the user.

Although not shown in FIG. 6, in an embodiment, if an input for selecting the third object 613 is received from the user, the processor 540 may perform a heart rate measurement function in the second measurement scheme. For example, if an input for selecting the third object 613 is received from the user, the processor 540 may perform a heart rate measurement function in units of specified time (e.g., units of 10 minutes). In an embodiment, the processor 540 may register a heart rate measurement function if an input for selecting the third object 613 is received from the user.

In an embodiment, if an input for selecting the third object 613 is received from the user, the processor 540 may display the same screen as the screen 621 in 620 on the display module 510. The processor 540, while displaying the same screen as the screen 621 in 620, may perform the heart rate measurement function in units of specified time (e.g., every 10 minutes) and display a produced heart rate on the display module 510 whenever the heart rate measurement function is performed. In an embodiment, if an input for selecting the object 623 is received from the user in the state of displaying the same screen as the screen 621 in 620 on the display module 510 upon receiving an input for selecting the third object 613 from the user, the processor 540 may perform the heart rate measurement function in the first measurement scheme as described above (e.g., in the same manner as the examples described using 630 and 640).

In an embodiment, the processor 540 may determine that a function performed in the first measurement scheme has a higher priority than a function performed in the second measurement scheme. For example, the processor 540 may assign (e.g., allocate) a higher priority to a function performed in the first measurement scheme than a function performed in the second measurement scheme. In an embodiment, the electronic device 101 may assign a higher priority to a function performed in the first measurement scheme than a function performed in the second measurement scheme, thereby reflecting the user's intention to immediately perform a function using a biometric signal in response to user input.

In an embodiment, the processor 540 may register functions using biometric signals and priorities respectively corresponding to the functions using biometric signals. For example, if an input for performing the second function in the first measurement scheme is received while the first function is being performed in the second measurement scheme, the processor 540 may register the first function and the priority of the first function (e.g., a second priority), and the second function and the priority of the second function (e.g., a first priority).

In an embodiment, the processor 540 may register functions using biometric signals and measurement schemes corresponding to respective functions using biometric signals. For example, if an input for performing a first function in a first measurement scheme is received, the processor 540 may register the first function and the first measurement scheme so as to correspond to the first function (e.g., so as to be mapped to the first function).

In an embodiment, if an input to perform a first function, which is the same as the first function performed in a second measurement scheme, in a first measurement scheme is received while performing the first function in the second measurement scheme, the processor 540 may recall the first function performed in the second measurement scheme and register the first function performed in the first measurement scheme. If the performance of the first function performed in the first measurement scheme is completed, the processor 540 may recall the first function performed in the first measurement scheme and register the first function performed in the second measurement scheme, for example, without user input (e.g., automatically). For example, if a user input to the object 623 in 620 of FIG. 6 (e.g., an input for performing a heart rate measurement function in the first measurement scheme) is received in order to perform a heart rate measurement function in the first measurement scheme while performing a heart rate measurement function in the second measurement scheme according to reception of an input for selecting the third object 613 from the user in 610 of FIG. 6, the processor 540 may recall the heart rate measurement function performed in the second measurement scheme and register the heart rate measurement function performed in the first measurement scheme. If performance of the heart rate measurement function in the first measurement scheme is completed, the processor 540 may recall the heart rate measurement function performed in the first measurement scheme and register the heart rate measurement function performed in the second measurement scheme.

In an embodiment, if an input to perform a first function, which is the same as the first function performed in the second measurement scheme, in the first measurement scheme is received while performing the first function in the second measurement scheme, the processor 540 may register the first function performed in the second measurement scheme and the first function performed in the first measurement scheme as independent (or separate) functions. In this case, the processor 540 may assign a higher priority to the first function performed in the first measurement scheme than to the first function performed in the second measurement scheme.

In an embodiment, the processor 540 may determine priority between functions using a biometric signal, based on the priority of a group corresponding to a function using a biometric signal. In an embodiment, the processor 540 may determine priority between functions using a biometric signal, based on the priority assigned to a group to which the function using a biometric signal belongs.

In an embodiment, the processor 540 may identify a group corresponding to a first function and a group corresponding to a second function. The processor 540 may identify the priority of the group corresponding to the first function and the priority of the group corresponding to the second function. The processor 540 may determine that a function, among the first function and the second function, corresponding to a group having a higher priority, among the priority of the group corresponding to the first function and the priority of the group corresponding to the second function, has a higher priority.

In an embodiment, the processor 540 may match (e.g., map) functions using a biometric signal to groups having different priorities. Table 1 below may indicate functions using biometric signals, groups corresponding to functions using biometric signals, and operation setting of the sensor module 520.

TABLE 1

| Functions | Priority groups | Operation setting of sensor module 520 |
|---|---|---|
| ECG measurement function | Group 1 | ECG sensor, 500 Hz (operating frequency and sampling frequency) |
| Blood pressure (BP) measurement function | Group 1 | PPG sensor using green light, 100 Hz |
| Oxygen saturation (SPO2) measurement function | Group 1 | PPG sensor using red light and infrared ray, 100 Hz |
| Heart rate measurement function during exercise | Group 1 | PPG sensor using green light, 25 Hz |
| PPG signal batch function | Group 2 | PPG sensor using green light, 25 Hz |
| Sleep monitoring function | Group 3 | PPG sensor using infrared ray, 25 Hz |
| Heart rate measurement function using infrared ray | Group 3 | PPG sensor using infrared ray, 25 Hz |
| Heart rate measurement function using green light | Group 4 | PPG sensor using green light, 25 Hz |
| Oxygen uptake ($VO_2$) measurement function | Group 4 | PPG sensor using green light, 25 Hz |
| Stress measurement function | Group 4 | PPG sensor using green light, 25 Hz |
| Wearing detection function | Group 5 | PPG sensor using infrared ray, 25 Hz |

In Table 1, priority may be set in the order of group 1, group 2, group 3, group 4, and group 5. For example, the highest priority may be set for group 1 among the groups (e.g., group 1 to group 5).

In Table 1, operation setting of the sensor module 520 may indicate the setting of the sensor module 520 used to perform a function. For example, an ECG measurement function may use an ECG sensor (e.g., three or more electrodes) to measure an ECG signal. As another example, a blood pressure measurement function may be performed based on a PPG signal measured using a green light from a light-emitting unit of the PPG sensor.

Although Table 1 shows that an operating frequency (e.g., a frequency for emitting light) and a sampling frequency (a frequency for obtaining a biometric signal from received light) are the same, the operating frequency and sampling frequency may be different from each other.

In an embodiment, the memory 530 may store the functions, information about the groups corresponding to the functions, and/or the operation setting of the sensor module 520 shown in Table 1. For example, as shown in Table 1, the processor 540 may store a table including the functions, information about the groups corresponding to the functions, and/or the operation setting of the sensor module 520 in the memory 530.

In an embodiment, the processor 540 may match (or include, assign, or configure) a function specified to be performed only in the first measurement scheme (e.g., a function specified not to be performed in the second measurement scheme and specified to be performed in the first measurement scheme) to a group having a higher priority (e.g., group 1 with the highest priority). For example, the processor 540 may match an ECG measurement function, a blood pressure measurement function, and a bioelectrical impedance analysis (BIA) function, although not shown in Table 1, to group 1. In an embodiment, the ECG measurement function, the blood pressure measurement function, and the BIA function may be functions that are inappropriate to be performed in the second measurement scheme of measuring a biometric signal, based on specified system settings of the electronic device 101 (e.g., in the case of continuously measuring a biometric signal without a user input) but appropriate to be performed in the first measurement scheme of performing a function in response to a user input. For example, in the case where the ECG measurement function is performed in the second measurement scheme, three or more electrodes must be in contact with (or in close contact with) the user's body for accurate measurement of an ECG signal and an electrical signal must be continuously applied to the user for a specified period of time or more for measurement of a biometric signal, which may adversely affect the user's body. Accordingly, performance of the ECG measurement function in the second measurement scheme may be inappropriate, and performance thereof in the first measurement scheme may be appropriate. The electronic device 101 may specify that the ECG measurement function is to be performed only in the first measurement scheme.

In an embodiment, the processor 540 may match a function that requires more resources for operation than other functions to a group having a higher priority than groups corresponding to other functions. For example, the processor 540 may match a blood pressure measurement function using a PPG sensor using a green light operating at 100 Hz and requiring many resources, compared to a heart rate measurement function using a PPG sensor using a green light operating at 25 Hz (e.g., when the operating frequency and/or sampling frequency is 25 Hz), to a group having a higher priority than the group corresponding to the heart rate measurement function using a PPG sensor using a green light operating at 25 Hz.

In an embodiment, the processor 540 may match a function using more elements included in the sensor module 520, compared to other functions, to a group having a higher priority than groups corresponding to other functions. For example, although not shown in Table 1, the processor 540 may match a BIA function performed using 4 or 8 electrodes, compared to an ECG signal measurement function using 3 electrodes, to a group having a higher priority than a group corresponding to the ECG signal measurement function using 3 electrodes. As another example, although not shown in Table 1, the processor 540 may match a pulse transmit time (PTT) measurement function using an ECG signal and a PPG signal, compared to an ECG signal measurement function using an ECG signal, to a group having a higher priority than a group corresponding to the ECG signal measurement function.

In an embodiment, the processor 540 may match a function that requires an additional operation in performing the function, compared to other functions, to a group having a higher priority than groups corresponding to other functions. For example, the processor 540, although not included in Table 1, may match a heart rate measurement function for producing a heart rate based on a PPG signal measured using a green light (e.g., a heart rate measurement function using a green light), compared to a function providing a PPG signal measured using a green light, to a group having a higher priority than a group corresponding to the function providing a PPG signal measured using a green light. As another example, the processor 540 may match a function of further performing an operation of controlling the operation of a PPG sensor by reflecting the motion of the user during exercise and measuring a heart rate using a green light (e.g., a function of measuring a heart rate during exercise), compared to a heart rate measurement function using a green light, to a group having a higher priority than a group corresponding to the heart rate measurement function using a green light. As another example, the processor 540, when measuring a PPG signal using a PPG sensor, may match a PPG signal batch function of storing the PPG signal measured using the PPG sensor for a specified period of time (e.g., a specified period) and transmitting the PPG signals stored for a specified period of time to the processor 540 at once, compared to a heart rate measurement function using a green light in which the measured PPG signal is immediately transmitted to the processor 540, to a group having a priority than a group corresponding to the heart rate measurement function using a green light.

In an embodiment, the processor 540 may match, compared to a function using a PPG sensor using a first light, a function using a PPG sensor using a second light different from the first light to a group having a higher priority than a group corresponding to the function using the PPG sensor using the first light. For example, if a user's motion is not detected through the sensor module 520 (e.g., an acceleration sensor) for a specified period of time while performing a heart rate measurement function using a green light, the processor 540 may perform a heart rate measurement function using an infrared ray, instead of the heart rate measurement function using a green light. The processor 540 may match, compared to a function using a PPG sensor using a green light (e.g., a heart rate measurement function using a green light), a function using a PPG sensor using an infrared ray other than the green light (e.g., a heart rate measurement function using an infrared ray) to a group having a higher priority than a group corresponding to the function using the PPG sensor using a green light.

In an embodiment, the processor 540 may match a function required to be performed in order to perform (or required to precede) other functions to a group having the lowest priority. For example, all functions included in Table 1 may be performed while the electronic device 101 is worn on the user's body. All functions included in Table 1, when executed, may be performed together with a wearing detection function. The processor 540 may match the wearing detection function required to be performed in order to perform other functions to a group having the lowest priority.

In an embodiment, the processor 540 may match functions having the same operation setting of the sensor module 520 to the same group (e.g., a group having the same priority). For example, the processor 540 may match a sleep monitoring function and a heart rate measurement function using an infrared ray that have the same operation setting of the sensor module 520 (e.g., setting in which a PPG sensor using an infrared ray operates at 25 Hz) to the same group (e.g., group 3).

In an embodiment, the processor 540 may match functions to groups, based on whether the functions are able to operate simultaneously. Hereinafter, "functions able to be performed simultaneously" may indicate a relative concept according to change in operation setting and/or addition thereof for each function of the sensor module 520 (e.g., the sensor module 520 configured as one package) and the order of performance time of the functions. For example, if an input for performing a wearing detection function performed using an infrared ray in an operating frequency of 25 Hz is received while performing an oxygen saturation (SPO2) measurement function performed using an infrared ray and a red light in an operating frequency of 100 Hz, the processor 540 may not need to change the operation setting of the sensor module 520. In this case, the wearing detection function may be a function capable of simultaneously operating with respect to the oxygen saturation measurement function. On the other hand, if an input for performing the oxygen saturation measurement function is received while the wearing detection function is being performed, the processor 540 may need to further use a red light in addition to the infrared ray and change the operating frequency from 25 Hz to 100 Hz. In this case, the oxygen saturation measurement function may be a function incapable of simultaneously operating with respect to the wearing detection function. As another example, an ECG measurement function using an ECG signal may be a function capable of simultaneous operating with respect to a PTT function using an ECG signal and a PPG signal, and the PTT function may be a function incapable of simultaneously operating with respect to the ECG measurement function. As another example, an ECG function using 3 electrodes may be a function capable of simultaneously operating with respect to a BIA function using 4 (or 8) electrodes, and the BIA function may be a function incapable of simultaneously operating with respect to the ECG function. In an embodiment, if a first function is able to operate simultaneously with respect to a second function and if the second function is unable to operate simultaneously with respect to the first function, the processor 540 may match the second function to a group having a higher priority than a group corresponding to the first function.

In an embodiment, in the case where the sensor module 520 includes a first sensor module and a second sensor module, if the first function is performed through the first sensor module and if the second function is performed through the second sensor module, the first function and the second function may be functions capable of being performed simultaneously with respect to each other. For example, in the case where the sensor module 520 may include a first sensor module including an ECG sensor and a second sensor module including a PPG sensor and independent of the first sensor module (e.g., as separate hardware (or separate package)), the first function performed through the first sensor module and the second function performed through the second sensor module may be functions capable of being performed simultaneously with respect to each other.

In an embodiment, the processor 540 may determine priority between functions, based on a function performance request time (or sequence thereof). For example, if a second input for performing a second function is received while a first function is being performed based on a first input for performing the first function, the processor 540 may determine that the second function of the second input received recently (or late in time) (e.g., the second function whose function performance request time is later than that of the first function), compared to the first input, has a higher priority. However, the disclosure is not limited thereto, and the processor 540, if a second input for performing a second function is received while a first function is being performed based on a first input for performing the first function, may determine that the first function of the first input received earlier than the second input has a higher priority.

In an embodiment, the processor 540 may determine priority between registered functions, based on at least one of a scheme for measuring a biometric signal (e.g., the first measurement scheme and the second measurement scheme), priorities of groups corresponding to functions, or a function performance request time. For example, the processor 540 may determine priority between registered functions, based on a scheme for measuring a biometric signal, priorities of groups corresponding to functions, or a function performance request time.

In an embodiment, the processor 540 may assign a weight to each of the functions (e.g., registered functions) for a scheme for measuring a biometric signal, priorities of groups corresponding to the functions, and a function performance request time, thereby determining the priority between functions.

Table 2 below may show weights for a scheme for measuring a biometric signal, priorities of groups corresponding to functions, and a function performance request time, respectively.

TABLE 2

| | | Weights |
|---|---|---|
| Measurement schemes | First measurement scheme | 2000 |
| | Second measurement scheme | 1000 |
| Groups according to priority | Group 1 | 500 |
| | Group 2 | 400 |
| | Group 3 | 300 |
| | Group 4 | 200 |
| | Group 5 | 100 |
| Function performance request time | First request | 1 |
| | Second request | 2 |

For example, referring to Table 2, if an input for performing a heart rate measurement function using an infrared ray corresponding to group 3 in the second measurement scheme is received, the processor 540 may calculate a weight (1301) by summating the weight (1000) for the second measurement scheme, the weight (300) for group 3, and the weight (1) for the first request. If an input for performing an oxygen uptake ($VO_2$) measurement function corresponding to group 4 in a first measurement scheme is received after receiving an input for performing a heart rate measurement function, the processor 540 may calculate a weight (2202) by summating the weight (2000) for the measurement scheme, the weight (200) for group 4, and the weight (2) for the second request. The processor 540 may determine that the oxygen uptake ($VO_2$) measurement function having a high sum of weights has a higher priority than the heart rate measurement function using an infrared ray.

In an embodiment, the memory 530 may store at least one of a measurement scheme, a corresponding group, a function performance request time, weights, or a sum of weights for each of the registered functions.

In an embodiment, the processor 540 may assign a high weight to a scheme for measuring a biometric signal, a group according to the priority, and a function performance request time in the order of the scheme for measuring a biometric signal, the group according to the priority, and the function performance request time. For example, the processor 540 may assign a weight in units of 1000 (e.g., 2000 and 1000) to the scheme for measuring a biometric signal, assign a weight in units of 100 (e.g., 100 to 500) to the group according to the priority, and assign a weight in units of 1 (e.g., 1 and 2) to the function performance request time. However, units for assigning weights to the scheme for measuring a biometric signal, the group according to the priority, and the function performance request time are not limited to the above-described examples.

In an embodiment, in the case where a function using a biometric signal is newly registered or where a registered function is recalled (e.g., whenever a function using a biometric signal is newly registered or a registered function is recalled), the processor 540 may assign weights to a scheme for measuring a biometric signal, priorities of groups corresponding to functions, and a function performance request time, thereby performing an operation of determining priority between the functions.

In an embodiment, the processor 540 may perform a function having a higher priority, based on the priority, among registered functions. For example, the processor 540 may perform a function having the highest priority, based on the priority, among registered functions.

In an embodiment, the processor 540 may perform, along with a function having the highest priority, a function capable of being performed simultaneously with respect to the function having the highest priority.

In an embodiment, the processor 540 may identify a function having the highest priority and identify whether each of all the remaining functions, excluding the function having the highest priority from the registered functions, is able to be performed simultaneously with the function having the highest priority.

In an embodiment, for the function capable of being performed simultaneously with the function having the highest priority, the processor 540 may store, in the memory 530, information indicating that the function is able to be performed simultaneously with the function having the highest priority. For example, for the function capable of being performed simultaneously with the function having the highest priority, the processor 540 may configure a flag (e.g., a flag value "1") indicating that the function is able to be performed simultaneously with the function having the highest priority. In an embodiment, for the function incapable of being performed simultaneously with the function having the highest priority, the processor 540 may store, in the memory 530, information indicating that the function is unable to be performed simultaneously with the function having the highest priority. For example, for the function incapable of being performed simultaneously with the function having the highest priority, the processor 540 may configure a flag (e.g., a flag value "0") indicating that the function is unable to be performed simultaneously with the function having the highest priority.

In an embodiment, the processor 540, based on the information indicating that the function is able to be performed simultaneously with the function having the highest priority and the information indicating that the function is unable to be performed simultaneously with the function having the highest priority, may perform both the function having the highest priority and the function capable of being performed simultaneously with the function having the highest priority.

Although FIG. 5 illustrates that the electronic device 101 includes the display module 510, the sensor module 520, the memory 530, and the processor 540, the disclosure is not limited thereto. For example, the electronic device 101 may further include at least some of the elements of the electronic device 101 described with reference to FIGS. 1, 2, 3 and 4.

Figure 7:
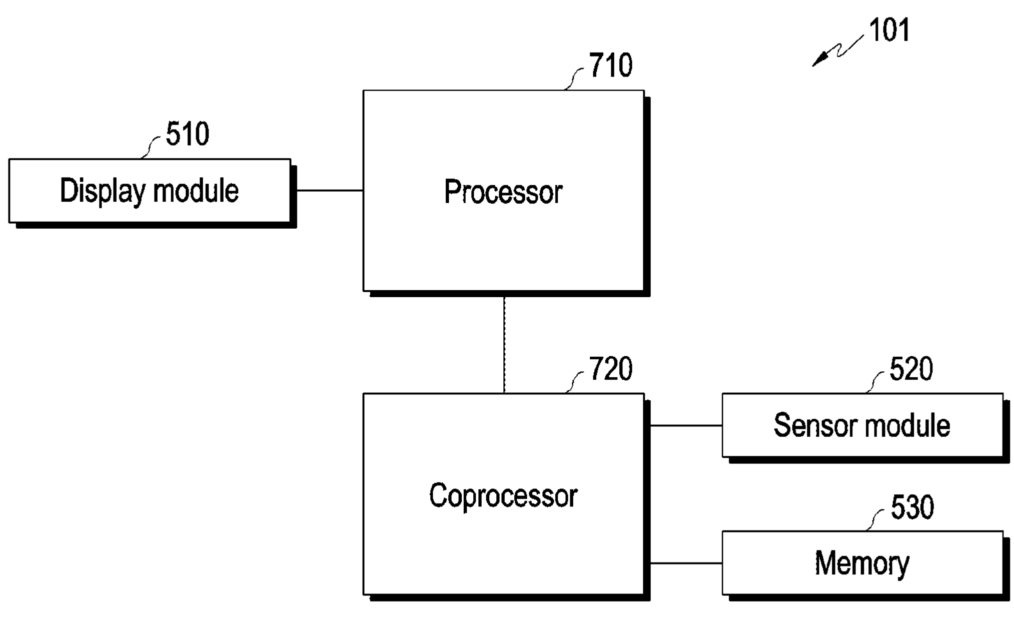
FIG. 7 is a block diagram illustrating an example configuration of an electronic device according to various embodiments.

FIG. 7 is a block diagram illustrating an example configuration of an electronic device 101 according to various embodiments.

Referring to FIG. 7, in an embodiment, an electronic device 101 may include a display module (e.g., including a display) 510, a sensor module (e.g., including at least one sensor) 520, a memory 530, a coprocessor (e.g., including processing circuitry) 720, and a processor (e.g., including processing circuitry) 710.

In an embodiment, the display module 510, the sensor module 520, and the memory 530 are the same as or similar to the display module 510, the sensor module 520, and the memory 530 in FIG. 5, respectively, so detailed description thereof may not be repeated here.

In an embodiment, the coprocessor 720 may be operatively connected to the sensor module 520, the memory 530, and the processor 710. In an embodiment, the coprocessor 720 may be included in the auxiliary processor 123 in FIG. 1. In an embodiment, the coprocessor 720 may operate with lower power, compared to the processor 710. In an embodiment, the coprocessor 720 may include a micro controller unit (MCU) (e.g., a sensor hub).

In an embodiment, the coprocessor 720 may include various processing circuitry and control an operation of performing a function using a biometric signal. For example, upon receiving information indicating that an input for performing a function using a biometric signal was received from the processor 710, the coprocessor 720 may register a function to be performed according to the received input. The coprocessor 720 may determine priority for registered functions (e.g., a function being executed and a function to be performed according to the received input) and perform a function having a higher priority, based on the determined priority. In an embodiment, the coprocessor 720 may transmit results according to the performance of registered functions to the processor 710.

In an embodiment, the processor 710 may be the same as or similar to the main processor 121 in FIG. 1. In an embodiment, the processor 710 may receive an input for performing a function using a biometric signal. If an input for performing a function using a biometric signal is received, the processor 710 may transmit information indicating that an input for performing a function using a biometric signal was received to the coprocessor 720. The processor 710 may receive results according to the performance of registered functions from the coprocessor 720. In an embodiment, the processor 710 may control the display of the display module to display information (e.g., biometric information) about the received results on the display module 510.

Figure 8:
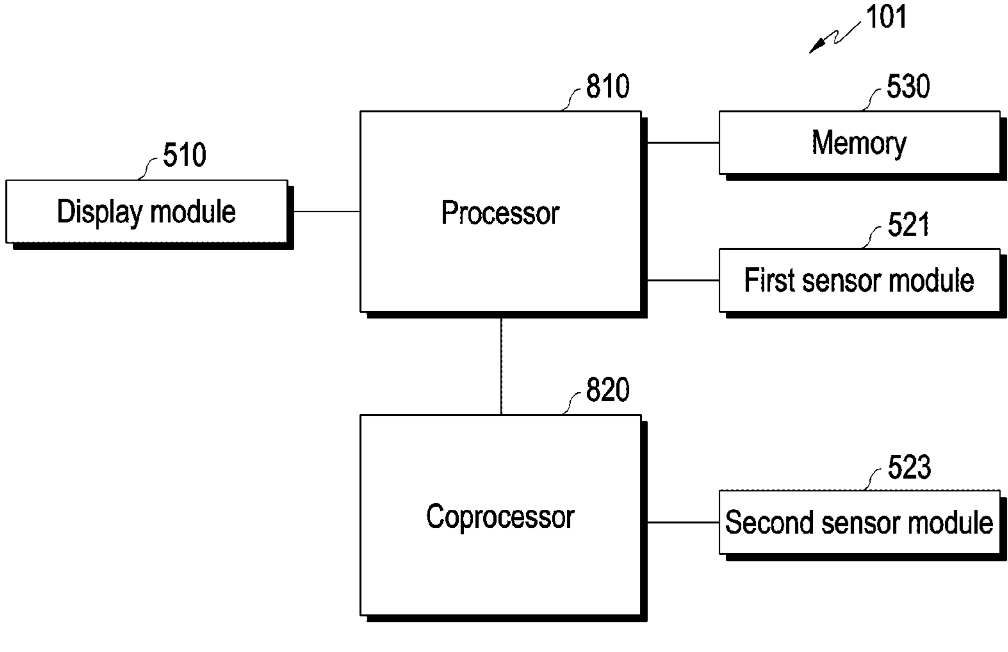
FIG. 8 is a block diagram illustrating an example configuration of an electronic device according to various embodiments.

FIG. 8 is a block diagram illustrating an example configuration of an electronic device 101 according to various embodiments.

Referring to FIG. 8, in an embodiment, an electronic device 101 may include a display module (e.g., including a display) 510, a first sensor module (e.g., including at least one sensor) 521, a second sensor module (e.g., including at least one sensor) 523, a memory 530, a coprocessor (e.g., including processing circuitry) 820, and a processor (e.g., including processing circuitry) 810.

In an embodiment, the display module 510 and the memory 530 are the same as or similar to the display module 510 and the memory 530 in FIG. 5 or 7, respectively, so detailed description thereof may not be repeated here.

In an embodiment, the first sensor module 521 and the second sensor module 523 may be included in the sensor module 520 in FIG. 5 or 7. For example, the first sensor module 521 and the second sensor module 523 may be independent sensor modules included in the sensor module 520 in FIG. 5 or 7. In an embodiment, the first sensor module 521 may be connected to the processor 810, and the second sensor module 523 may be connected to the coprocessor 820.

In an embodiment, the coprocessor 820 may be operatively connected to the second sensor module 523 and the processor 810. In an embodiment, the coprocessor 820 may be included in the auxiliary processor 123 in FIG. 1. In an embodiment, the coprocessor 820 may operate with lower power than the processor 810. In an embodiment, the coprocessor 820 may include a micro controller unit (MCU) (e.g., a sensor hub).

In an embodiment, the coprocessor 820 may include various processing circuitry and control operations of elements included in the second sensor module 523.

In an embodiment, the processor 810 may be the same as or similar to the main processor 121 in FIG. 1. In an embodiment, the processor 810 may include various processing circuitry and control operations of elements included in the first sensor module 521. In an embodiment, the processor 810 may perform a function, based on a biometric signal measured through the first sensor module 521. In an embodiment, the processor 810 may control, through the coprocessor 820, the operation of the second sensor module 523 connected to the coprocessor 820. For example, the processor 810 may transmit a control signal to the second sensor module 523 connected to the coprocessor 820 through the coprocessor 820. The processor 810 may receive the biometric signal received from the second sensor module 523 connected to the coprocessor 820 through the coprocessor 820.

In an embodiment, the processor 810 may receive an input for performing a function using a biometric signal. In an embodiment, the processor 810 may control an operation of performing a function using a biometric signal. For example, if an input for performing a function using a biometric signal is received, the processor 810 may register a function to be performed based on the received input. The processor 810 may determine priority for registered functions (e.g., a function being executed and a function to be performed according to the received input) and perform a function having a higher priority, based on the determined priority. In an embodiment, the processor 810 may display results according to the performance of registered functions on the display module 510.

An electronic device according to various example embodiments of the disclosure may include: a sensor module, comprising at least one sensor, configured to measure a biometric signal, at least one processor functionally connected to the sensor module, and a memory functionally connected to the at least one processor, wherein the memory may include instructions that, when executed, cause the at least one processor to: receive an input for performing a second function using a second biometric signal while performing a first function using a first biometric signal, determine a priority between the first function and the second function, based on a measurement scheme of the second biometric signal specified by the input and a measurement scheme of the first biometric signal, and perform a function having a higher priority, among the first function and the second function, using the sensor module, based on the priority.

In various example embodiments, the measurement scheme of the biometric signal may include a first measurement scheme for measuring a biometric signal in response to an input for performing a function using the biometric signal and a second measurement scheme for measuring a biometric signal, based on a specified setting, wherein the instructions, when executed, cause the at least one processor to determine that, among the first function and the second function, a function performed in the first measurement scheme has a higher priority than a function performed in the second measurement scheme.

In various example embodiments, the instructions may, when executed, cause the at least one processor to: identify a first group corresponding to the first function and a second group corresponding to the second function from among a plurality of groups included in the memory and having different priorities set therefor, and determine the priority between the first function and the second function, based on the measurement scheme of the second biometric signal, the measurement scheme of the first biometric signal, the priority of the first group, and the priority of the second group.

In various example embodiments, the instructions may, when executed, cause the at least one processor to assign the highest priority to a group, among the plurality of groups, including a function specified to be performed in the first measurement scheme, among a plurality of functions using the biometric signal.

In various example embodiments, the instructions may, when executed, cause the at least one processor to match functions having the same operation setting of the sensor module to the same group among the plurality of groups.

In various example embodiments, the instructions may, when executed, cause the at least one processor to assign the lowest priority to a group, among the plurality of groups, including a function performed to perform other functions among the plurality of functions.

In various example embodiments, the instructions may, when executed, cause the at least one processor to: identify a time at which the input is requested and a time at which an input for performing the first function is requested, and determine the priority between the first function and the second function, based on the measurement scheme of the second biometric signal, the measurement scheme of the first biometric signal, the priority of the first group, the priority of the second group, the time at which the input is requested, and the time at which an input for performing the first function is requested.

In various example embodiments, the instructions may, when executed, cause the at least one processor to: obtain a first weight of the first function, based on a weight for the measurement scheme of the first biometric signal, a weight for the first group, and a weight for the time at which an input for performing the first function is requested, obtain a second weight of the second function, based on a weight for the measurement scheme of the second biometric signal, a weight for the second group, and a weight for the time at which the input is requested, and determine the priority between the first function and the second function, based on the first weight and the second weight.

In various example embodiments, the instructions may, when executed, cause the at least one processor to: set the weight for the measurement scheme of the biometric signal to be higher than weights for the plurality of groups and set the weights for the plurality of groups to be higher than the weight for the time at which the input for performing the function using the biometric signal is requested.

In various example embodiments, the instructions may, when executed, cause the at least one processor to: determine, among the first function and the second function, whether a function having a lower priority is able to be performed simultaneously with respect to a function having a higher priority and based on determining that the function having a lower priority is able to be performed simultaneously with respect to the function having a higher priority, perform the function having a lower priority together with the function having the higher priority.

An electronic device according to various example embodiments of the disclosure may include: a sensor module, comprising at least one sensor, configured to measure a biometric signal, at least one processor functionally connected to the sensor module, and a memory functionally connected to the at least one processor and including a plurality of groups having different priorities set therefor, wherein the memory may include instructions that, when executed, cause the at least one processor to: receive an input for performing a second function using a second biometric signal while performing a first function using a first biometric signal, identify a first group corresponding to the first function and a second group corresponding to the second function, from among the plurality of groups, determine priority between the first function and the second function, based on the priority of the first group and the priority of the second group, and perform a function having a higher priority, among the first function and the second function, based on the priority, using the sensor module.

Figure 9:
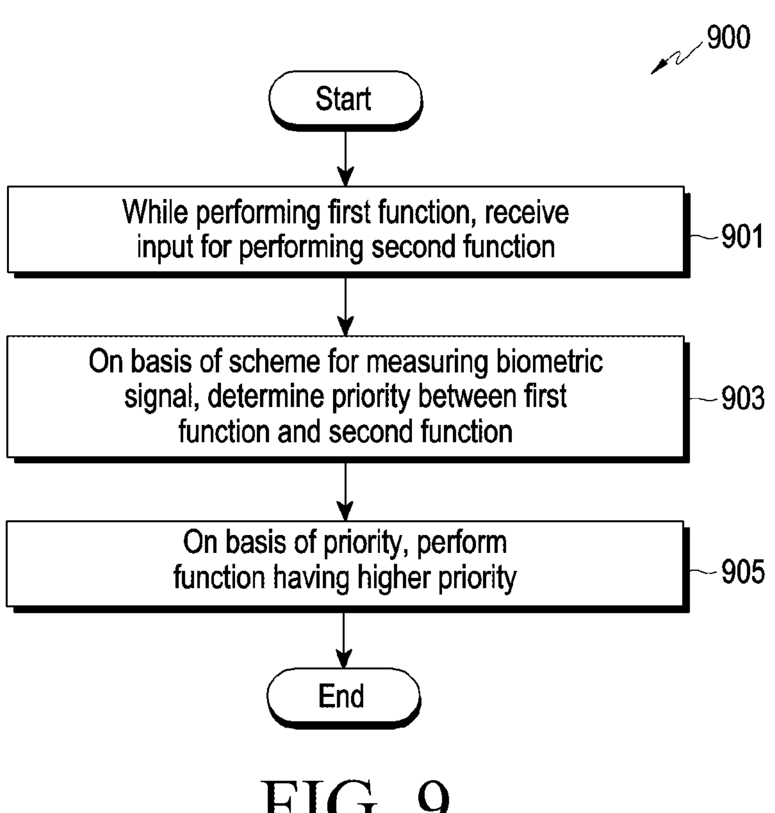
FIG. 9 is a flowchart illustrating an example method of performing a function using a biometric signal according to a priority determined based on a measurement scheme of a biometric signal according to various embodiments.

FIG. 9 is a flowchart 900 illustrating an example method of performing a function using a biometric signal according to a priority determined based on a measurement scheme of a biometric signal according to various embodiments.

Referring to FIG. 9, in operation 901, in an embodiment, the processor 120 may receive an input for performing a second function (e.g., a second function using a biometric signal) while performing a first function (e.g., a first function using a biometric signal).

In an embodiment, if an input (or request) for performing a second function is received, the processor 120 may register the second function. For example, if an input for performing a first function is received, the processor 120 may register the first function and perform the first function. If an input for performing a second function is received while performing the first function, the processor 120 may register the first function and the second function.

In an embodiment, if an input for performing a function using a biometric signal is received, the processor 120 may register a function related to the received input using a table related to registration (e.g., indicating a function being performed or scheduled to be performed). For example, if an input for performing a second function is received while performing a first function, the processor 120 may include the first function and the second function in the table.

Although not shown in FIG. 9, in an embodiment, the processor 120, after a function using a biometric signal is registered, may recall the registered function. For example, if performance of a function using a biometric signal is completed, the processor 120 may recall the function that has been performed. As another example, if a function using a biometric signal is registered and then if an input for canceling the performance of the registered function is received, the processor 120 may recall the registered function. In an embodiment, if the registered function is recalled, the recalled function may be excluded (e.g., removed) from the table.

In an embodiment, an input for performing a function using a biometric signal may include an input from a user using an application related to the biometric signal. For example, an input for performing a function using a biometric signal may include a user input for performing a heart rate measurement function.

In an embodiment, an input for performing a function using a biometric signal may include an input according to system settings of the electronic device 101. For example, an input for performing a function using a biometric signal may include an input for performing a wearing detection function input from the system of the electronic device 101 if specified conditions are satisfied (e.g., when the electronic device 101 is turned on or when an application related to a biometric signal is executed).

In operation 903, in an embodiment, the processor 120 may determine priority between the first function and the second function, based on a scheme for measuring a biometric signal. For example, the processor 120 may identify a scheme for measuring a biometric signal in order to perform a second function specified by an input for performing the second function (e.g., the input in operation 901) and a measurement scheme of a biometric signal for the first function being performed. The processor 120 may determine priority between the first function and the second function, based on the scheme for measuring a biometric signal to perform the second function and the measurement scheme of a biometric signal for the first function being performed.

In an embodiment, the measurement scheme of a biometric signal may include a first measurement scheme for measuring a biometric signal in response to a user input for performing a function using a biometric signal and a second measurement scheme for measuring a biometric signal, based on specified settings.

In an embodiment, the processor 120 may determine that a function performed in the first measurement scheme has a higher priority than a function performed in the second measurement scheme. For example, the processor 120 may assign a higher priority to a function performed in the first measurement scheme than a function performed in the second measurement scheme. In an embodiment, the electronic device 101 may assign a higher priority to a function performed in the first measurement scheme than a function performed in the second measurement scheme, thereby reflecting the user's intention to immediately perform a function using a biometric signal in response to user input.

In an embodiment, the processor 120 may register functions using biometric signals and priorities respectively corresponding to the functions using biometric signals. For example, if an input for performing a second function in the first measurement scheme is received while a first function is being performed in the second measurement scheme, the processor 120 may register the first function and the priority of the first function (e.g., a second priority), and the second function and the priority of the second function (e.g., a first priority).

In an embodiment, the processor 120 may register functions using biometric signals and measurement schemes corresponding to respective functions using biometric signals. For example, if an input for performing a first function in a first measurement scheme is received, the processor 120 may register the first function and the first measurement scheme so as to correspond to the first function (e.g., so as to be mapped to the first function).

In operation 905, in an embodiment, the processor 120 may perform a function having a higher priority, among the first function and the second function, using the sensor module 520, based on the priority.

In an embodiment, in the case where at least one function is registered in addition to the first function and the second function, the processor 120 may perform a function having the highest priority, among the first function, the second function, and the at least one function. In an embodiment, if it is determined that the second function has a higher priority than the first function and the at least one function, among the first function, the second function, and at least one function, the processor 120 may perform the second function and then, when the performance of the second function is completed, recall the second function. If the second function is recalled, the processor 120 may determine a function having the highest priority from among the first function and the at least one function. The processor 120 may perform the function determined to have the highest priority.

Figure 10:
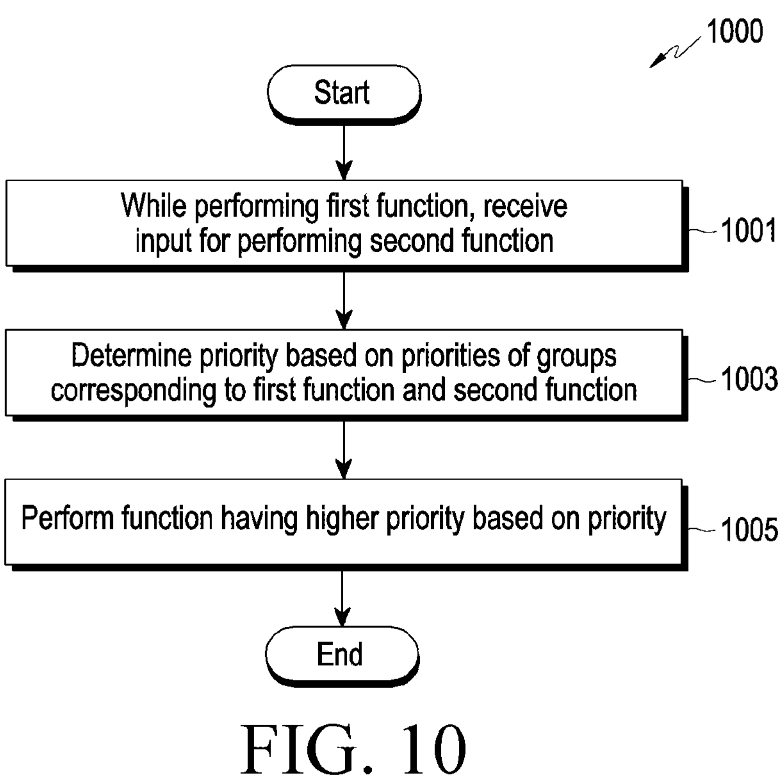
FIG. 10 is a flowchart illustrating an example method of performing a function using a biometric signal according to a priority of a group corresponding to a function using a biometric signal according to various embodiments.

FIG. 10 is a flowchart 1000 illustrating an example method of performing a function using a biometric signal according to a priority of a group corresponding to a function using a biometric signal according to various embodiments.

Referring to FIG. 10, in operation 1001, in an embodiment, the processor 120 may receive an input for performing a second function (e.g., a second function using a biometric signal) while performing a first function (e.g., a first function using a biometric signal).

In an embodiment, since the examples of operation 1001 are at least partially the same as or similar to those of operation 901 in FIG. 9, detailed descriptions thereof may not be repeated here.

In operation 1003, in an embodiment, the processor 120 may determine priority between the first function and the second function, based on priorities of a group corresponding to the first function and a group corresponding to the second function.

In an embodiment, the processor 120 may match (e.g., map) functions using biometric signals to groups having different priorities from each other. For example, the processor 120 may match functions using biometric signals to groups having different priorities, as shown in Table 1 described above.

In an embodiment, the processor 120 may match (or include, assign, or set) a function specified to be performed only in the first measurement scheme (e.g., a function specified not to be performed in the second measurement scheme and specified to be performed in the first measurement scheme) to a group having a higher priority (e.g., group 1 with the highest priority).

In an embodiment, the processor 120 may match a function that requires more resources for operation (e.g., a blood pressure measurement function using a PPG sensor using a green light operating at 100 Hz) than other functions (e.g., a heart rate measurement function using a PPG sensor using a green light operating at 25 Hz) to a group having a higher priority than groups corresponding to other functions.

In an embodiment, the processor 120 may match a function using more elements included in the sensor module 520 (e.g., a BIA function performed using 4 or 8 electrodes), compared to other functions (e.g., an ECG signal measurement function using 3 electrodes), to a group having a higher priority than groups corresponding to other functions.

In an embodiment, the processor 120 may match a function that requires an additional operation in performing the function (e.g., a heart rate measurement function using a green light), compared to other functions (e.g., a function providing a PPG signal measured using a green light), to a group having a higher priority than groups corresponding to other functions.

In an embodiment, the processor 120 may match, compared to a function using a PPG sensor using a first light (e.g., a heart rate measurement function using a green light), a function using a PPG sensor using a second light different from the first light (e.g., a heart rate measurement function using an infrared ray) to a group having a higher priority than a group corresponding to the function using the PPG sensor using the first light.

In an embodiment, the processor 120 may match a function (e.g., a wearing detection function) to be performed (or required to be performed or to be performed first) in order to perform other functions to a group having the lowest priority.

In an embodiment, the processor 120 may match functions (a sleep monitoring function and a heart rate measurement function using an infrared ray) that have the same operation setting of the sensor module 520 (e.g., setting in which a PPG sensor using an infrared ray operates at 25 Hz) to the same group (e.g., group 3 having the same priority).

In an embodiment, processor 120 may match functions to groups, based on whether the functions are able to operate simultaneously. For example, if a first function is able to operate simultaneously with respect to a second function and if the second function is unable to operate simultaneously with respect to the first function, the processor 120 may match the second function to a group having a higher priority than a group corresponding to the first function.

In an embodiment, the processor 120 may identify a group corresponding to the first function and a group corresponding to the second function. The processor 120 may identify the priority of the group corresponding to the first function and the priority of the group corresponding to the second function. The processor 120 may determine that a function, among the first function and the second function, corresponding to a group having a higher priority, among the priority of the group corresponding to the first function and the priority of the group corresponding to the second function, has a higher priority.

In operation 1005, in an embodiment, the processor 120 may perform a function having a higher priority, among the first function and the second function, using the sensor module 520, based on the priority determined through the examples of operation 1003.

In an embodiment, since the examples of operation 1005 are at least partially the same as or similar to those of operation 905 in FIG. 9, detailed descriptions thereof may not be repeated here.

Figures 11, 12:
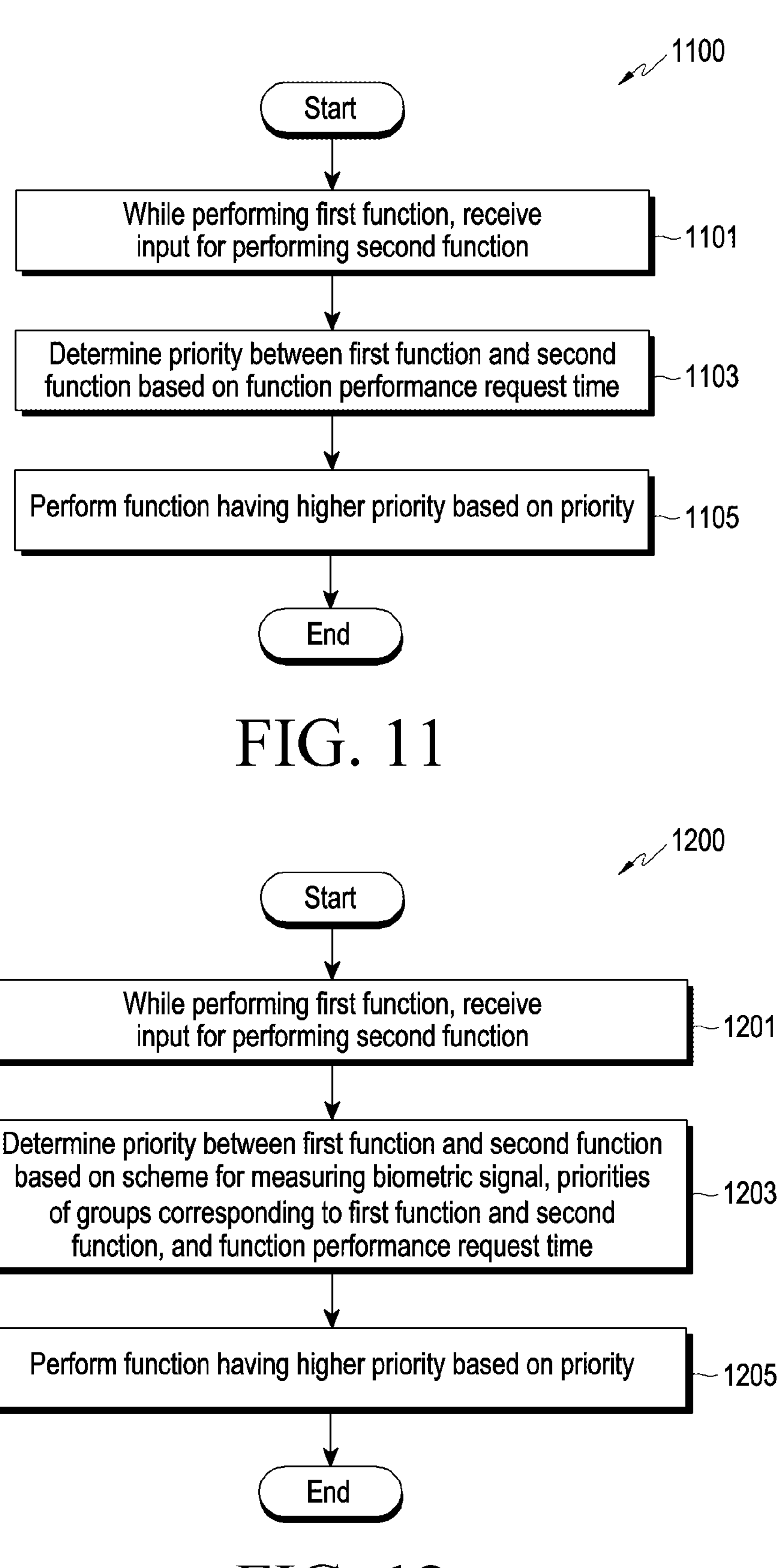
FIG. 11 is a flowchart illustrating an example method of performing a function using a biometric signal according to a function request time using a biometric signal according to various embodiments.
FIG. 12 is a flowchart illustrating an example method for performing a function using a biometric signal according to a scheme for measuring a biometric signal, a priority of a group corresponding to a function, and a time for requesting performance of a function using a biometric signal according to various embodiments.

FIG. 11 is a flowchart 1100 illustrating an example method of performing a function using a biometric signal according to a function request time using a biometric signal according to various embodiments.

Referring to FIG. 11, in operation 1101, in an embodiment, the processor 120 may receive an input for performing a second function (e.g., a second function using a biometric signal) while performing a first function (e.g., a first function using a biometric signal).

In an embodiment, since the examples of operation 1101 are at least partially the same as or similar to those of operation 901 in FIG. 9, detailed descriptions thereof may not be repeated here.

In operation 1103, in an embodiment, the processor 120 may determine priority between the first function and the second function, based on a function request time. For example, if a second input for performing a second function is received while a first function is being performed based on a first input for performing the first function, the processor 120 may determine that the second function of the second input received recently (or late in time) (e.g., the second function whose function performance request time is later than that of the first function), compared to the first input, has a higher priority. However, the disclosure is not limited thereto, and the processor 120, if a second input for performing a second function is received while a first function is being performed based on a first input for performing the first function, may determine that the first function of the first input received earlier than the second input has a higher priority In operation 1105, in an embodiment, the processor 120 may perform a function having a higher priority, among the first function and the second function, using the sensor module 520, based on the priority determined through the non-limiting examples of operation 1103.

In an embodiment, since the examples of operation 1105 are at least partially the same as or similar to those of operation 905 in FIG. 9, detailed descriptions thereof may not be repeated here.

FIG. 12 is a flowchart 1200 illustrating an example method for performing a function using a biometric signal according to a scheme for measuring a biometric signal, a priority of a group corresponding to a function, and a time for requesting performance of a function using a biometric signal according to various embodiments.

Referring to FIG. 12, in operation 1201, in an embodiment, the processor 120 may receive an input for performing a second function (e.g., a second function using a biometric signal) while performing a first function (e.g., a first function using a biometric signal).

In an embodiment, since the examples of operation 1201 are at least partially the same as or similar to those of operation 901 in FIG. 9, detailed descriptions thereof may not be repeated here.

In operation 1203, in an embodiment, the processor 120 may determine priority between the first function and the second function, based on a scheme for measuring a biometric signal, a priority of a group corresponding to the function, and a time for requesting performance of a function using a biometric signal.

In an embodiment, the processor 120 may assign weights to a scheme for measuring a biometric signal, priorities of groups corresponding to functions, and a function performance request time for each of the functions (e.g., registered functions) as shown, for example, in Table 2 described above, thereby determining the priority between the functions.

In an embodiment, the processor 120 may assign a high weight to a scheme for measuring a biometric signal, a group according to the priority, and a function performance request time in the order of the scheme for measuring a biometric signal, the group according to the priority, and the function performance request time.

In an embodiment, in the case where a function using a biometric signal is newly registered or where a registered function is recalled (e.g., whenever a function using a biometric signal is newly registered or a registered function is recalled), the processor 120 may assign weights to a scheme for measuring a biometric signal, priorities of groups corresponding to functions, and a function performance request time, thereby performing an operation of determining priority between the functions.

In an embodiment, the processor 120 may store, in the memory 530, at least one of a measurement scheme, a corresponding group, a function performance request time, weights, or a sum of weights for each of the registered functions.

In operation 1205, in an embodiment, the processor 120 may perform a function having a higher priority, among the first function and the second function, using the sensor module 520, based on the priority determined through the non-limiting examples of operation 1203.

In an embodiment, since the examples of operation 1205 are at least partially the same as or similar to those of operation 905 in FIG. 9, detailed descriptions thereof may not be repeated here.

Figure 13:
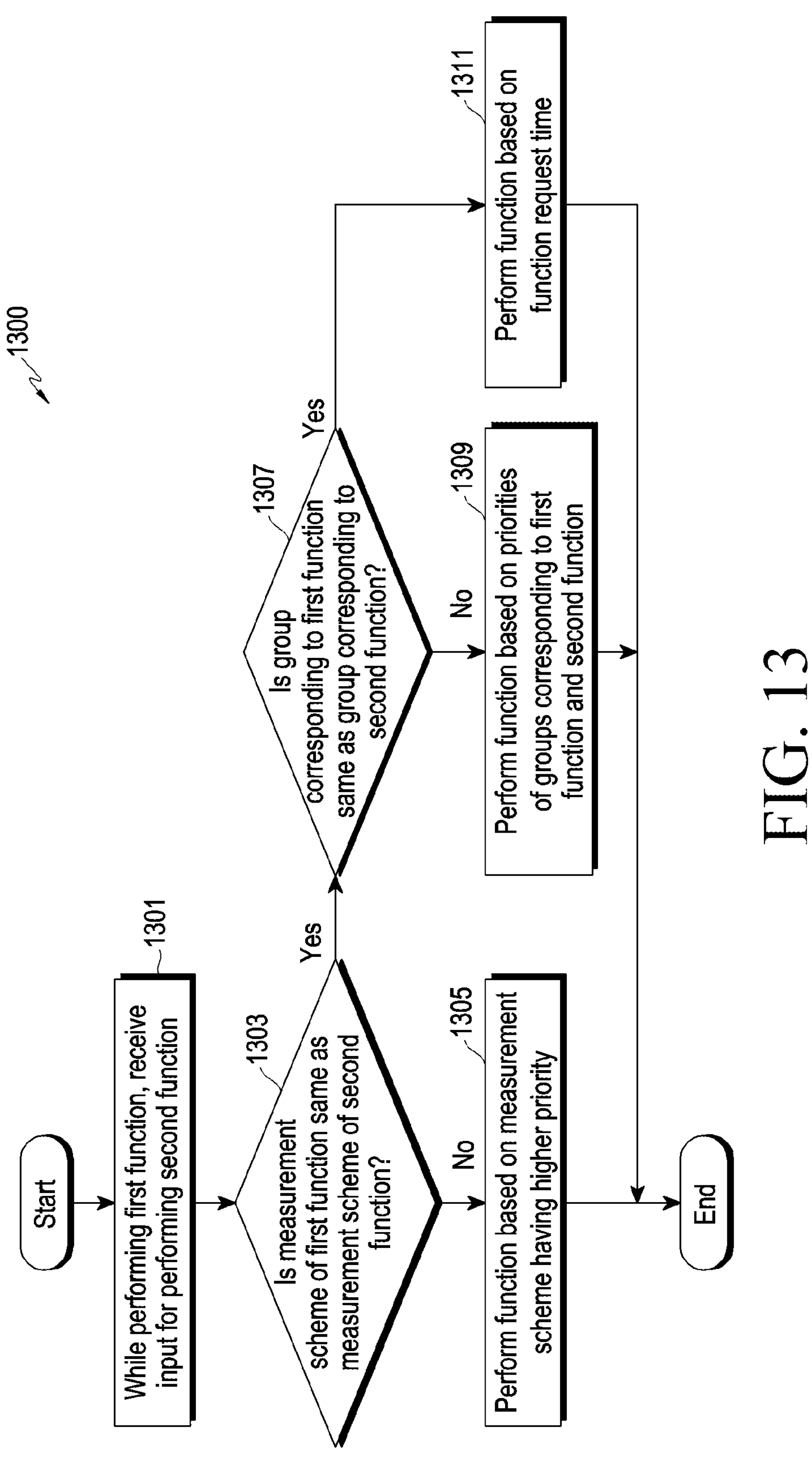
FIG. 13 is a flowchart illustrating an example method for performing a function using a biometric signal according to at least one of a scheme for measuring a biometric signal, a priority of a group corresponding to a function, and a time for requesting performance of a function using a biometric signal according to various embodiments.

FIG. 13 is a flowchart 1300 illustrating an example method for performing a function using a biometric signal according to at least one of a scheme for measuring a biometric signal, a priority of a group corresponding to a function, and a time for requesting performance of a function using a biometric signal according to various embodiments.

Referring to FIG. 13, in operation 1301, in an embodiment, the processor 120 may receive an input for performing a second function (e.g., a second function using a biometric signal) while performing a first function (e.g., a first function using a biometric signal).

In an embodiment, since the examples of operation 1301 are at least partially the same as or similar to those of operation 901 in FIG. 9, detailed descriptions thereof may not be repeated here.

In operation 1303, in an embodiment, the processor 120 may identify whether a measurement scheme of the first function is the same as or similar to a measurement scheme of the second function.

In an embodiment, the processor 120 may identify the measurement scheme of the first function and the measurement scheme of the second function. If the measurement scheme of the first function and the measurement scheme of the second function are identified as a first measurement scheme, the processor 120 may identify that the measurement scheme of the first function is the same as or similar to the measurement scheme of the second function. If the measurement scheme of the first function and the measurement scheme of the second function are identified as a second measurement scheme, the processor 120 may identify that the measurement scheme of the first function is the same as or similar to the measurement scheme of the second function. If the measurement scheme of the first function is a first measurement scheme and if the measurement scheme of the second function is identified as a second measurement scheme, the processor 120 may identify that the measurement scheme of the first function is different from the measurement scheme of the second function. If the measurement scheme of the first function is a second measurement scheme and if the measurement scheme of the second function is identified as a first measurement scheme, the processor 120 may identify that the measurement scheme of the first function is different from the measurement scheme of the second function.

In operation 1305, in an embodiment, if it is identified that the measurement scheme of the first function is different from the measurement scheme of the second function in operation 1303, the processor 120 may perform a function, based on a measurement scheme having a high priority (e.g., the first measurement scheme). For example, if it is identified that the measurement scheme of the first function is a second measurement scheme and that the measurement scheme of the second function is a first measurement scheme, the processor 120 may perform the second function in preference to the first function (e.g., may assign a higher priority to the second function than the first function and perform the second function).

In operation 1307, in an embodiment, if it is identified that the measurement scheme of the first function is the same as or similar to the measurement scheme of the second function in operation 1303, the processor 120 may identify whether a group corresponding to the first function is the same as a group corresponding to the second function. For example, in the case where the first function and the second function correspond to group 2 in the aforementioned example Table 1, the processor 120 may identify that the first function and the second function belong to the same group. As another example, in the case where the first function corresponds to group 2 in the Table 1 described above and where the second function corresponds to group 1 in the Table 1 described above, the processor 120 may identify that the first function and the second function belong to different groups from each other.

In operation 1309, in an embodiment, if it is identified in operation 1307 that the group corresponding to the first function is different from the group corresponding to the second function, the processor 120 may perform a function, based on priorities of the groups corresponding to the first function and the second function. For example, if the first function corresponds to a first group and if the second function corresponds to a second group, the processor 120 may perform the first function in preference to the second function.

In operation 1311, in an embodiment, if it is identified in operation 1307 that the group corresponding to the first function is the same as the group corresponding to the second function, the processor 120 may perform a function, based on a function request time. For example, the processor 120 may the first function in preference to the second function because a function request time of the first function (e.g., an input time for performing the first function) is earlier than a function request time of the second function.

Figure 14:
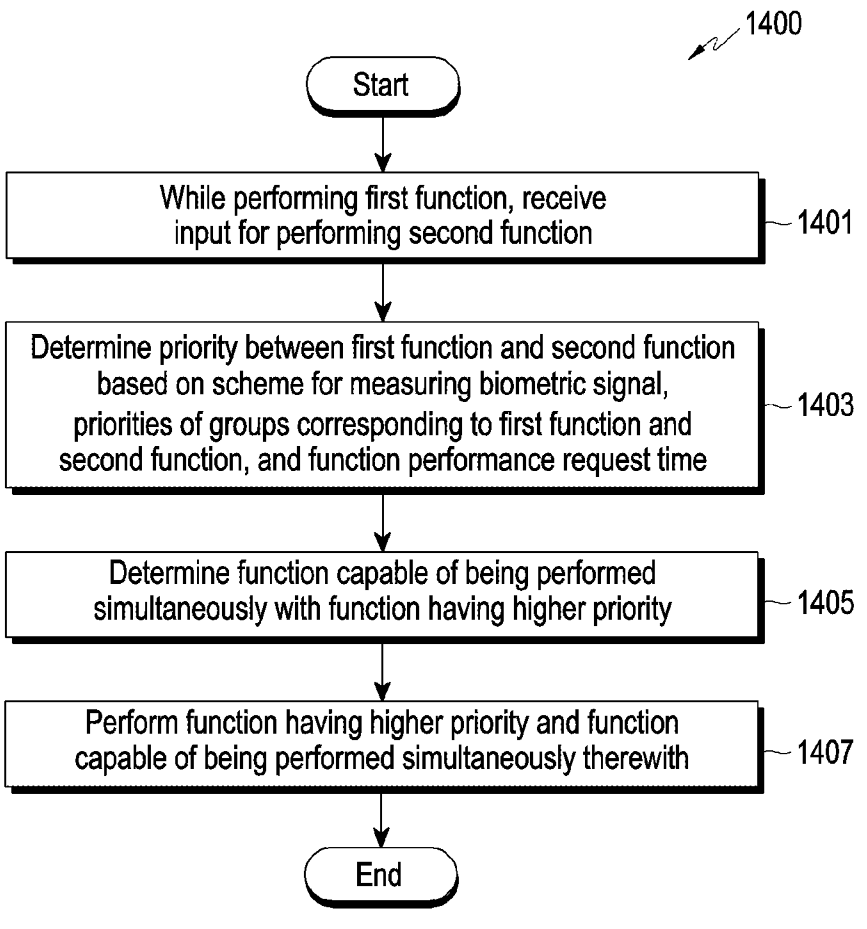
FIG. 14 is a flowchart illustrating an example method for performing a function using a biometric signal according to a scheme for measuring a biometric signal, a priority of a group corresponding to a function, and a time for requesting performance of a function using a biometric signal according to various embodiments.

FIG. 14 is a flowchart 1400 illustrating an example method for performing a function using a biometric signal according to a scheme for measuring a biometric signal, a priority of a group corresponding to a function, and a time for requesting performance of a function using a biometric signal according to various embodiments.

Referring to FIG. 14, in operation 1401, in an embodiment, the processor 120 may receive an input for performing a second function (e.g., a second function using a biometric signal) while performing a first function (e.g., a first function using a biometric signal).

In an embodiment, since the examples of operation 1401 are at least partially the same as or similar to those of operation 901 in FIG. 9, detailed descriptions thereof may not be repeated here.

In operation 1403, in an embodiment, the processor 120 determines priority between the first function and the second function, based on a scheme for measuring a biometric signal, a priority of a group corresponding to a function, and a time for requesting performance of a function using a biometric signal.

In an embodiment, since the examples of operation 1403 are at least partially the same as or similar to those of operation 1203 in FIG. 12, detailed descriptions thereof may not be repeated here.

In operation 1405, in an embodiment, the processor 120 may determine a function capable of being performed simultaneously with a function having a high priority (e.g., a function having the highest priority among registered functions). For example, the processor 120 may identify whether each of all the remaining functions, excluding the function having the highest priority from the registered functions, is able to be performed simultaneously with the function having the highest priority.

In an embodiment, for the function capable of being performed simultaneously with the function having the highest priority, the processor 120 may store, in the memory 530, information indicating that the function is able to be performed simultaneously with the function having the highest priority. For example, for the function capable of being performed simultaneously with the function having the highest priority, the processor 120 may set a flag (e.g., a flag value "1") indicating that the function is able to be performed simultaneously with the function having the highest priority. In an embodiment, for the function incapable of being performed simultaneously with the function having the highest priority, the processor 120 may store, in the memory 530, information indicating that the function is unable to be performed simultaneously with the function having the highest priority. For example, for the function incapable of being performed simultaneously with the function having the highest priority, the processor 120 may set a flag (e.g., a flag value "0") indicating that the function is unable to be performed simultaneously with the function having the highest priority.

In operation 1407, in an embodiment, the processor 120 may perform a function having a high priority (e.g., the function having the highest priority) and a function capable of being performed concurrently with the function having a high priority.

For example, the processor 120, based on the information indicating that the function is able to be performed simultaneously with the function having the highest priority and the information indicating that the function is unable to be performed simultaneously with the function having the highest priority, may perform both the function having the highest priority and the function capable of being performed simultaneously with the function having the highest priority.

Figure 15:
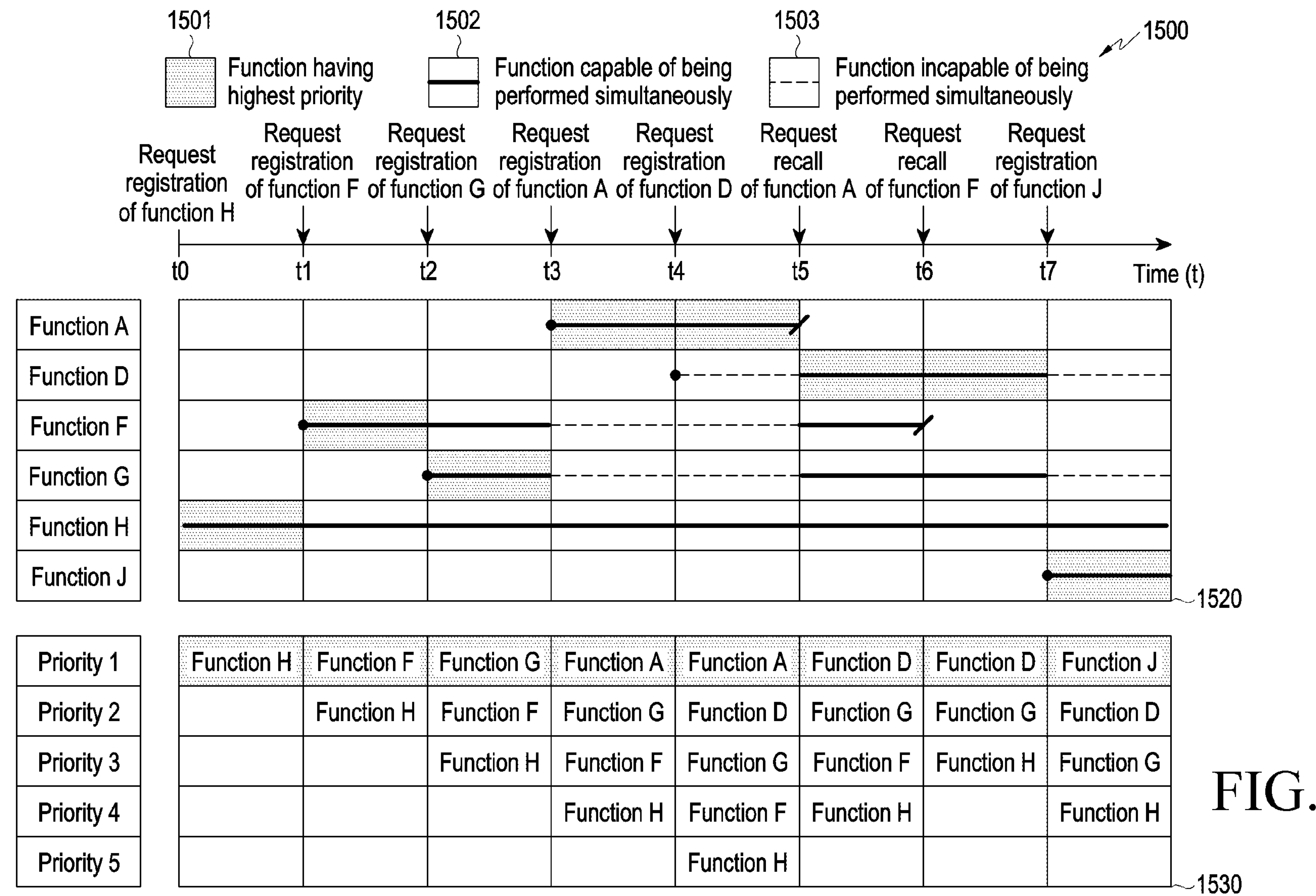
FIG. 15 is a diagram illustrating an example method of performing a function using a biometric signal according to various embodiments.

FIG. 15 is a diagram 1500 illustrating an example of performing a function using a biometric signal according to various embodiments.

Referring to FIG. 15, 1520 may show priority between registered functions and a function to be performed, among the registered functions, in the case where the functions are registered or recalled according to time t. 1530 may show priorities of the registered functions (e.g., in the case of having priorities in the order of priority 1 (e.g., the highest priority), priority 2, priority 3, priority 4, and priority 5 (e.g., the lowest priority)) in the case where the functions are registered or recalled according to time t. 1501 may indicate a function having the highest priority. 1502 may indicate a function that is performed (or operate) simultaneously with a function having the highest priority, and 1503 may indicate a function that is not performed simultaneously (e.g., incapable of being performed simultaneously) with a function having the highest priority.

Table 3 below may show, if each of registered functions has the first priority (highest priority), a function capable of being performed simultaneously with a function having the first priority.

TABLE 3

| | | Function capable of simultaneously operate with function having first priority | | | | | |
|---|---|---|---|---|---|---|---|
| | | Function A | Function D | Function F | Function G | Function H | Function J |
| Function having first priority | Function A | | x | x | x | 0 | x |
| | Function D | x | | o | o | o | x |
| | Function F | x | x | | o | o | x |
| | Function G | x | x | o | | o | x |
| | Function H | x | x | x | x | | o |
| | Function J | x | x | x | x | o | |

For example, in Table 3, if function A currently has the first priority, among the registered functions, only function H may be a function capable of being performed simultaneously with respect to function A. As another example, in Table 3, if function D has the first priority, among the registered functions, function F and function G may be functions capable of being performed simultaneously with respect to function D, and function A and function J may be functions incapable of being performed simultaneously with respect to function D. As another example, in Table 3, function H may be a function capable of being performed simultaneously with respect to other registered functions (e.g., function A, function D, function F, function G, and function J), whereas other registered functions may be functions incapable of performed simultaneously with respect to function H. Hereinafter, examples related to FIG. 15 will be described with reference to Table 3.

In an embodiment, if a request for registration of function H (e.g., an input for performing function H) is received at time t0, the processor 120 may register function H. The processor 120 may assign the highest priority to function H and perform function H.

In an embodiment, if a request for registration of function F is received at time t1, the processor 120 may register function F in addition to function H. The processor 120 may determine that the priority of function F is higher than that of function H, based on at least one of a scheme for measuring a biometric signal, a priority of a group corresponding to a function, and a function performance request time. The processor 120 may identify that function H is a function capable of being performed simultaneously with respect to function F having the highest priority. The processor 120 may perform function F having the highest priority and function H capable of being performed simultaneously with function F.

In an embodiment, if a request for registration of function G is received at time t2, the processor 120 may register function G in addition to function H and function F. The processor 120 may determine that the priority of function G is higher than the priority of function H and the priority of function F, based on at least one of a scheme for measuring a biometric signal, a priority of a group corresponding to a function, or a function performance request time. The processor 120 may identify that function H and function F are functions capable of being performed simultaneously with respect to function G having the highest priority. The processor 120 may perform function G having the highest priority, and function H and function F capable of being performed simultaneously with function G.

In an embodiment, if a request for registration of function A is received at time t3, the processor 120 may register function A in addition to function H, function F, and function G. The processor 120 may set the priority in the order of function A, function G, function F, and function H, based on at least one of a scheme for measuring a biometric signal, a priority of a group corresponding to a function, and a function performance request time. The processor 120 may identify that function H is able to be performed simultaneously with respect to function A having the highest priority but that function F and function G are unable to be performed simultaneously with respect to the same. The processor 120 may perform function A having the highest priority and function H capable of being performed simultaneously with function A.

In an embodiment, if a request for registration of function D is received at time t4, the processor 120 may register function D in addition to function H, function F, function G, and function A. The processor 120 may determine the priority in the order of function A, function D, function G, function F, and function H, based on at least one of a scheme for measuring a biometric signal, a priority of a group corresponding to a function, and a function performance request time. The processor 120 may identify that function H is able to performed simultaneously with respect to function A having the highest priority and that function F, function G, and function D are functions incapable of performed simultaneously with respect to the same. The processor 120 may perform function A having the highest priority and function H capable of being performed simultaneously with function A.

In an embodiment, if a request for recall of function A is received at time t5, the processor 120 may recall function A. For example, if performance of function A is completed at time t5, the processor 120 may recall function A. The processor 120 may set the priority in the order of function D, function G, function F, and function H, based on at least one of a scheme for measuring a biometric signal, a priority of a group corresponding to a function, and a function performance request time. The processor 120 may identify that function H, function F, and function G are functions capable of being performed simultaneously with respect to function D having the highest priority. The processor 120 may perform function D having the highest priority and function H, function F, and function G capable of being performed simultaneously with function D.

In an embodiment, if a request for recall of function F is received at time t6, the processor 120 may recall function F. The processor 120 may determine the priority in the order of function D, function G, and function H, based on at least one of a scheme for measuring a biometric signal, a priority of a group corresponding to a function, and a function performance request time. The processor 120 may identify that function H and function G are functions capable of being performed simultaneously with respect to function D having the highest priority. The processor 120 may perform function D having the highest priority and function H and function G capable of being performed simultaneously with function D.

In an embodiment, if a request for registration of function J is received at time t7, the processor 120 may register function J in addition to function D, function G, and function H. The processor 120 may determine the priority in the order of function J, function D, function G, and function H, based on at least one of a scheme for measuring a biometric signal, a priority of a group corresponding to a function, and a function performance request time. The processor 120 may identify that function H is able to be performed simultaneously with respect to function J having the highest priority and that function D and function G are unable to be performed simultaneously with respect to the same. The processor 120 may perform function J having the highest priority, and function H and function G capable of being performed simultaneously with function J.

A method for performing a function using a biometric signal in an electronic device according to various example embodiments of the disclosure may include: receiving an input for performing a second function using a second biometric signal while performing a first function using a first biometric signal, determining priority between the first function and the second function, based on a measurement scheme of the second biometric signal specified by the input and a measurement scheme of the first biometric signal, and performing a function having a higher priority, among the first function and the second function, using a sensor module of the electronic device, based on the priority.

In various example embodiments, the measurement scheme of the biometric signal may include a first measurement scheme for measuring a biometric signal in response to an input for performing a function using the biometric signal and a second measurement scheme for measuring a biometric signal, based on a specified setting, and the determining the priority between the first function and the second function may include determining that, among the first function and the second function, a function performed in the first measurement scheme has a higher priority than a function performed in the second measurement scheme.

In various example embodiments, the method may further include identifying a first group corresponding to the first function and a second group corresponding to the second function from among a plurality of groups included in the memory and having different priorities set therefor, and the determining the priority between the first function and the second function may include determining the priority between the first function and the second function, based on the measurement scheme of the second biometric signal, the measurement scheme of the first biometric signal, the priority of the first group, and the priority of the second group.

In various example embodiments, the method may further include assigning a highest priority to a group, among the plurality of groups, including a function specified to be performed in the first measurement scheme, among a plurality of functions using the biometric signal.

In various example embodiments, the assigning the highest priority to a group, among the plurality of groups, including a function specified to be performed in the first measurement scheme, among a plurality of functions using the biometric signal, may include matching functions having a same operation setting of the sensor module to the same group among the plurality of groups.

In various example embodiments, the assigning the highest priority to a group, among the plurality of groups, including a function specified to be performed in the first measurement scheme, among a plurality of functions using the biometric signal, may include assigning a lowest priority to a group, among the plurality of groups, including a function performed to perform other functions among the plurality of functions.

In various example embodiments, the method may further include identifying a time at which the input is requested and a time at which an input for performing the first function is requested, and the determining the priority between the first function and the second function may include determining the priority between the first function and the second function, based on the measurement scheme of the second biometric signal, the measurement scheme of the first biometric signal, the priority of the first group, the priority of the second group, the time at which the input is requested, and the time at which an input for performing the first function is requested.

In various example embodiments, the determining the priority between the first function and the second function may include obtaining a first weight of the first function, based on a weight for the measurement scheme of the first biometric signal, a weight for the first group, and a weight for the time at which an input for performing the first function is requested, obtaining a second weight of the second function, based on a weight for the measurement scheme of the second biometric signal, a weight for the second group, and a weight for the time at which the input is requested, and determining the priority between the first function and the second function, based on the first weight and the second weight.

In various example embodiments, the method may further include setting the weight for the measurement scheme of the biometric signal to be higher than weights for the plurality of groups and setting the weights for the plurality of groups to be higher than the weight for the time at which the input for performing the function using the biometric signal is requested.

In various example embodiments, the performing of the function having a higher priority, among the first function and the second function, may include, based on determining that the function having a lower priority is able to be performed simultaneously with respect to the function having a higher priority, perform the function having a lower priority together with the function having a higher priority.

In various example embodiments, the method may further include registering the first function and the second function, and the registering the first function and the second function may include, based on the first function and the second function corresponding to the same function and based on the operation setting of the sensor module related to the first function being different from the operation setting of the sensor module related to the second function, registering the first function and the second function independently.

In addition, the structure of data used in the embodiments of the disclosure described above may be recorded on a non-transitory computer-readable recording medium through various means. The non-transitory computer-readable recording medium may include a storage medium such as a magnetic storage medium (e.g., ROM, floppy disk, hard disk, etc.) and an optical reading medium (e.g., CD-ROM, DVD, etc.).

A non-transitory computer-readable recording medium on which programs executable in a computer are recorded include a program that, when executed, causes an electronic device to perform operations including: receiving an input for performing a second function using a second biometric signal while performing a first function using a first biometric signal, determining priority between the first function and the second function, based on a measurement scheme of the second biometric signal specified by the input and a measurement scheme of the first biometric signal, and performing a function having a higher priority, among the first function and the second function, using a sensor module of the electronic device, based on the priority.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable electronic device comprising:

a sensor module, comprising at least one sensor, configured to measure a biometric signal;

at least one processor comprising processor circuitry functionally connected to the sensor module; and memory storing instructions that, when executed by the at least one processor individually or collectively, cause the wearable electronic device to:

detect, while measuring a first biometric signal by the sensor module, an event for measuring a second biometric signal by the sensor module, determine a priority between the measurement for the first biometric signal and the measurement of the second biometric signal, and based on the priority, perform, using the sensor module, a measurement having a higher priority among the measurement for the first biometric signal and the measurement of the second biometric signal, wherein the higher priority is assigned to the measurement for the second biometric signal rather than the measurement for the first biometric signal, when a measurement scheme for measuring the second biometric signal corresponds to a manual measurement scheme and a measurement scheme for measuring the first biometric signal corresponds to a continuous measurement scheme and/or a periodic measurement scheme.

2. The wearable electronic device of claim 1, wherein the instructions, when executed by the at least one processor individually or collectively, cause the wearable electronic device to:

identify a first group corresponding to the measurement for the first biometric signal and a second group corresponding to the measurement for the second biometric signal from among a plurality of groups included in the memory and having priorities set differently, and determine the priority between the measurement for the first biometric signal and the measurement for the second biometric signal, based on the measurement scheme for measuring the second biometric signal, the measurement scheme for measuring the first biometric signal, a priority of the first group, and a priority of the second group.

3. The wearable electronic device of claim 2, wherein the instructions, when executed by the at least one processor individually or collectively, cause the wearable electronic device to assign a highest priority to a group, among the plurality of groups, including a measurement specified to be performed by the manual measurement scheme, among a plurality of measurements for the biometric signal.

4. The wearable electronic device of claim 3, wherein the instructions, when executed by the at least one processor individually or collectively, cause the wearable electronic device to match measurements performed by a same operation setting of the sensor module to a same group among the plurality of groups.

5. The wearable electronic device of claim 3, wherein the instructions, when executed by the at least one processor individually or collectively, cause the wearable electronic device to:

assign a lowest priority to a group, among the plurality of groups, including a measurement performed to perform other measurements among the plurality of measurements.

6. The wearable electronic device of claim 2, wherein the instructions, when executed by the at least one processor individually or collectively, cause the wearable electronic device to:

identify a time at which the event for measuring the second biometric signal is detected and a time at which an event for measuring the first biometric signal is detected, and determine the priority between the measurement for the first biometric signal and the measurement for the second biometric signal, based on the measurement scheme for measuring the second biometric signal, the measurement scheme for measuring the first biometric signal, the priority of the first group, the priority of the second group, the time at which the event for measuring the second biometric signal is detected, and the time at which the event for measuring the measurement for the first biometric signal is detected.

7. The wearable electronic device of claim 6, wherein the instructions, when executed by the at least one processor individually or collectively, cause the wearable electronic device to:

obtain a first weight of the measurement for the first biometric signal, based on a weight for the measurement scheme for measuring the first biometric signal, a weight for the first group, and a weight for the time at which the event for measuring the first biometric signal is detected, obtain a second weight of the measurement for the second biometric signal, based on a weight for the measurement scheme for measuring the second biometric signal, a weight for the second group, and a weight for the time at which the event for measuring the second biometric signal is detected, and determine the priority of the measurement for the first biometric signal and the priority of the measurement for the second biometric signal, based on the first weight and the second weight.

8. The wearable electronic device of claim 7, wherein the instructions, when executed by the at least one processor individually or collectively, further cause the wearable electronic device to:

set the weight for the measurement scheme for measuring the biometric signal to be higher than weights for the plurality of groups and set the weights for the plurality of groups to be higher than the weight for a time at which an event for measuring the biometric signal is detected.

9. The wearable electronic device of claim 1, wherein the instructions, when executed by the at least one processor individually or collectively, further cause the wearable electronic device to:

determine whether a measurement having a lower priority is capable of being performed simultaneously with respect to a measurement having the higher priority between the measurement for the first biometric signal and the measurement for the second biometric signal, based on determining that the measurement having the lower priority is capable of being performed simultaneously with respect to the measurement having the higher priority, perform the measurement having the lower priority together with the measurement having the higher priority, and based on determining that the measurement having the lower priority is not capable of being performed simultaneously with respect to the measurement having the higher priority, perform the measurement having the lower priority after performing the measurement having the higher priority.

10. A method for performing a function using a biometric signal in a wearable electronic device, the method comprising:

detecting, while measuring a first biometric signal by a sensor module of the wearable electronic device, an event for measuring a second biometric signal by the sensor module;

determining a priority between the measurement for the first biometric signal and the measurement of the second biometric signal; and based on the priority, performing, using the sensor module, a measurement having a higher priority, among the measurement for the first biometric signal and the measurement of the second biometric signal, wherein the higher priority is assigned to the measurement for the second biometric signal rather than the measurement for the first biometric signal, when a measurement scheme for measuring the second biometric signal corresponds to a manual measurement scheme and a measurement scheme for measuring the first biometric signal corresponds to a continuous measurement scheme or a periodic measurement scheme.

11. The method of claim 10, further comprising:

identifying a first group corresponding to the measurement for the first biometric signal and a second group corresponding to the measurement for the second biometric signal from among a plurality of groups included in memory of wearable electronic device and having priorities set differently, wherein the determining of the priority comprises:

determining the priority between the measurement for the first biometric signal and the measurement for the second biometric signal, based on the measurement scheme for measuring the second biometric signal, the measurement scheme for measuring the first biometric signal, a priority of the first group, and a priority of the second group.

12. The method of claim 11, further comprising assigning a highest priority to a group, among the plurality of groups, including a measurement specified to be performed by the manual measurement scheme, among a plurality of measurements using the biometric signal.

13. The method of claim 12, wherein the assigning of the highest priority to a group comprises:

matching measurements performed by a same operation setting of the sensor module to a same group among the plurality of groups.

14. The method of claim 11, further comprising:

identifying a time at which the event for measuring the second biometric signal is detected and a time at which an event for measuring the first biometric signal is detected, wherein the determining of the priority comprises:

determining the priority between the measurement for the first biometric signal and the measurement for the second biometric signal, based on the measurement scheme for measuring the second biometric signal, the measurement scheme for measuring the first biometric signal, the priority of the first group, the priority of the second group, the time at which the event for measuring the second biometric signal is detected, and the time at which for measuring the first biometric signal is detected.

15. The method of claim 14, wherein the determining of the priority comprises:

obtaining a first weight of the measurement for the first biometric signal, based on a weight for the measurement scheme for measuring the first biometric signal, a weight for the first group, and a weight for the time at which the event for measuring the first biometric signal is detected;

obtaining a second weight of the measurement for the second biometric signal, based on a weight for the measurement scheme for measuring the second biometric signal, a weight for the second group, and a weight for the time at which the event for measuring the second biometric signal is detected; and determining the priority of the measurement for the first biometric signal and the priority of the measurement for the second biometric signal, based on the first weight and the second weight.

16. The method of claim 10, further comprising:

determining whether a measurement having a lower priority is capable of being performed simultaneously with respect to a measurement having the higher priority between the measurement for the first biometric signal and the measurement for the second biometric signal;

based on determining that the measurement having the lower priority is capable of being performed simultaneously with respect to the measurement having the higher priority, performing the measurement having the lower priority together with the measurement having the higher priority, and based on determining that the measurement having the lower priority is not capable of being performed simultaneously with respect to the measurement having the higher priority, performing the measurement having the lower priority after performing the measurement having the higher priority.

17. The method of claim 10, further comprising registering the measurement for the first biometric signal and the measurement for the second biometric signal, wherein the registering of the measurement for the first biometric signal and the measurement for the second biometric signal comprises:

based on the measurement for the first biometric signal and the measurement for the second biometric signal corresponding to a same function and based on a operation setting of the sensor module related to the measurement for the first biometric signal being different from a operation setting of the sensor module related to the measurement for the second biometric signal, registering the measurement for the first biometric signal and the measurement for the second biometric signal independently.

18. A non-transitory computer-readable storage media storing computer-executable instructions that, when executed by at least one processor of a wearable electronic device, cause the electronic device to perform operations comprising:

detecting, while performing a first function for measuring a first biometric signal by a sensor module of the wearable electronic device, an event for performing a second function for measuring a second biometric signal by the sensor module;

determining a priority between the first function and the second function, based on a measurement scheme for measuring the second biometric signal corresponding to the event and a measurement scheme for measuring the first biometric signal; and performing a function having a higher priority, among the first function and the second function, using the sensor module, based on the priority, wherein the determining of the priority between the first function and the second function comprises:

determining a higher priority to the second function than the first function, based on the measurement scheme for measuring the second biometric signal corresponding to the event being a first measurement scheme and the measurement scheme for measuring the first biometric signal being a second measurement scheme, and wherein the first measurement scheme includes a manual measurement scheme, and the second measurement scheme includes at least one of a continuous measurement scheme or a measurement scheme in units of specified time.

* * * * *